United States Patent
Youn et al.

(10) Patent No.: US 12,160,843 B2
(45) Date of Patent: Dec. 3, 2024

(54) RELAY COMMUNICATION

(71) Applicant: LG ELECTRONICS INC., Seoul (KR)

(72) Inventors: Myungjune Youn, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 17/777,166

(22) PCT Filed: Nov. 10, 2020

(86) PCT No.: PCT/KR2020/015695
§ 371 (c)(1),
(2) Date: May 16, 2022

(87) PCT Pub. No.: WO2021/096193
PCT Pub. Date: May 20, 2021

(65) Prior Publication Data
US 2022/0408396 A1   Dec. 22, 2022

(30) Foreign Application Priority Data
Nov. 14, 2019  (KR) .................. 10-2019-0146138

(51) Int. Cl.
*H04W 60/06*  (2009.01)
*H04W 8/20*  (2009.01)
*H04W 76/30*  (2018.01)

(52) U.S. Cl.
CPC ............. *H04W 60/06* (2013.01); *H04W 8/20* (2013.01); *H04W 76/30* (2018.02)

(58) Field of Classification Search
CPC ....... H04W 60/06; H04W 8/20; H04W 76/30; H04W 76/34; H04W 60/04; H04W 88/04; H04W 92/18
See application file for complete search history.

(56) References Cited

U.S. PATENT DOCUMENTS

2019/0037518 A1   1/2019 Russell et al.
2019/0342851 A1*  11/2019 Shan .................. H04W 76/11
(Continued)

FOREIGN PATENT DOCUMENTS

KR   101928497   2/2019
WO   2019031865  2/2019

OTHER PUBLICATIONS

Fang, Dongfeng, and Feng Ye. "Identity management framework for e-health systems over 5g networks." 2018 IEEE International Conference on Communications (ICC). IEEE, 2018. (Year: 2018).*
(Continued)

*Primary Examiner* — Sharad Rampuria
(74) *Attorney, Agent, or Firm* — LEE, HONG, DEGERMAN, KANG & WAIMEY

(57) ABSTRACT

A disclosure of the present specification provides a method for an AMF node to communicate. The method comprises the steps of: receiving, from a UDM node, updated subscriber information about a Remote UE; determining whether to stop a service to the Remote UE on the basis of the updated subscriber information about the Remote UE; and transmitting, to a Relay UE communicating with the Remote UE, a deregistration request message requesting deregistration of the Remote UE.

11 Claims, 23 Drawing Sheets

(56) References Cited

U.S. PATENT DOCUMENTS

| | | | |
|---|---|---|---|
| 2020/0112906 A1* | 4/2020 | Chaponniere | H04W 4/60 |
| 2020/0196375 A1* | 6/2020 | Ryu | H04W 76/34 |
| 2021/0127351 A1* | 4/2021 | Stojanovski | H04W 28/0268 |

OTHER PUBLICATIONS

Sun, Hengyi, et al. "A Dedicated Line-Based 5G-NR Dedicated Network Communication Between Unmanned Systems and Ground Stations." IEEE Communications Magazine (2023). (Year: 2023).*
Nokia, "AMF Deregistration," 3GPP TSG-CT WG4 Meeting #94, C4-194011, Sep. 27, 2019, 11 pages.
PCT International Application No. PCT/KR2020/015695, International Search Report dated Feb. 15, 2021, 4 pages.

* cited by examiner

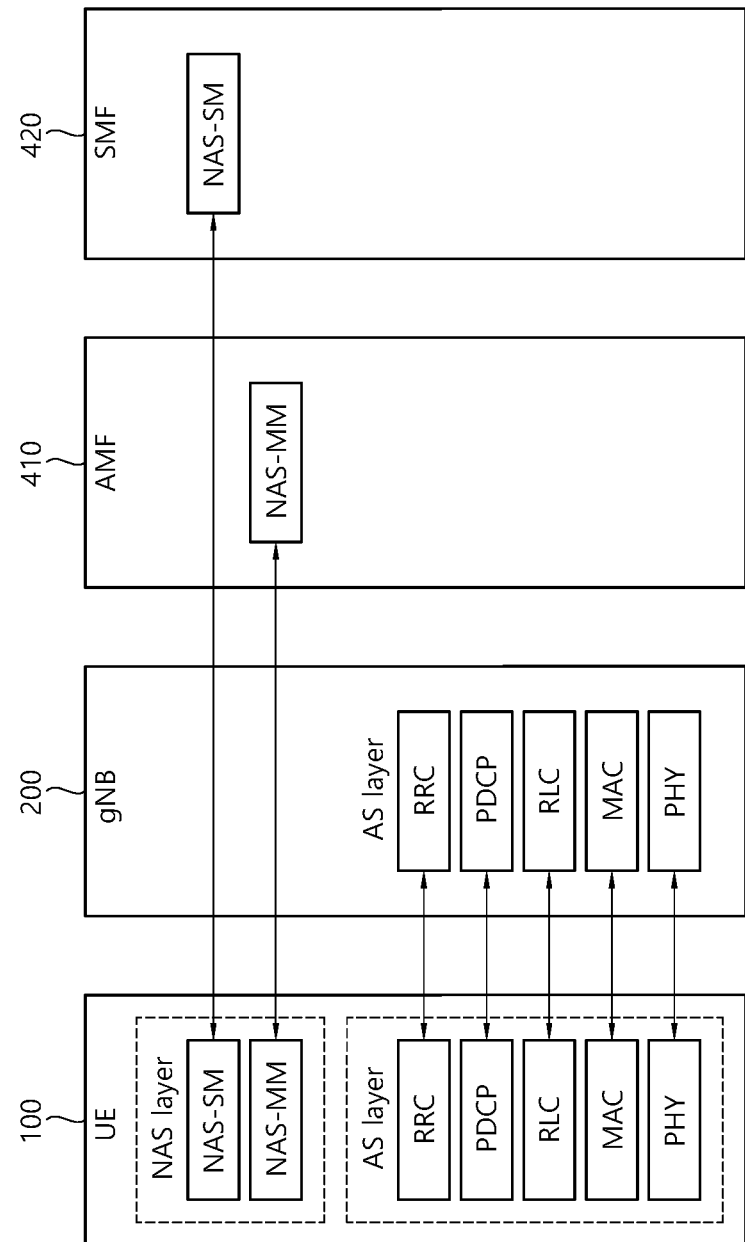

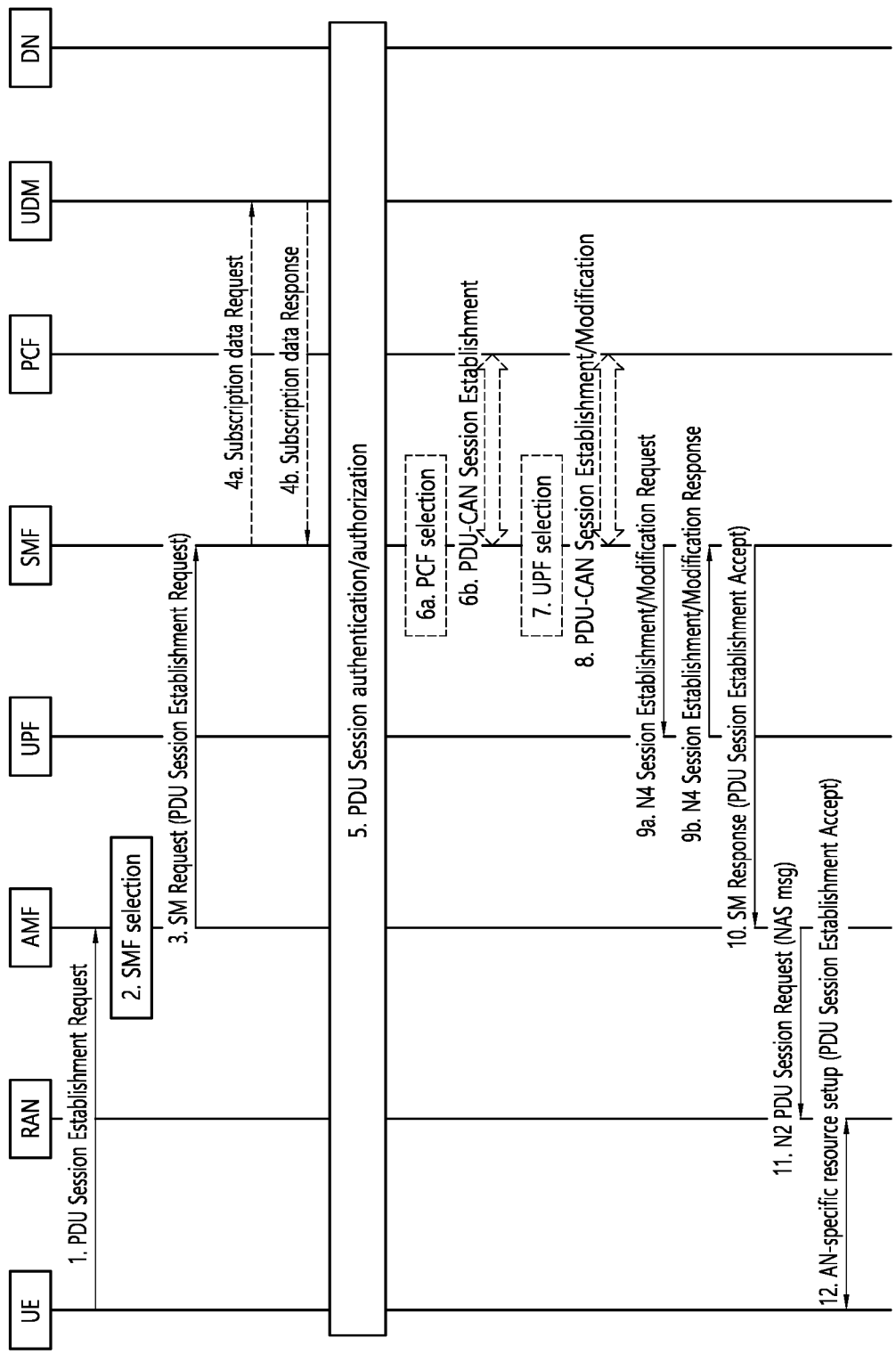

RELAY COMMUNICATION

CROSS-REFERENCE TO RELATED APPLICATIONS

This application is the National Stage filing under 35 U.S.C. 371 of International Application No. PCT/KR2020/015695, filed on Nov. 10, 2020, which claims the benefit of earlier filing date and right of priority to Korean Application No. 10-2019-0146138, filed on Nov. 14, 2019, the contents of which are all incorporated by reference herein in their entirety.

TECHNICAL FIELD

The present specification relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

When a terminal (eg, Remote User Equipment (UE)) is connected to a 5G network through a relay UE through an L3 (layer 3) relay, the 5G network cannot transmits and receives NAS messages to and from the terminal (eg, Remote UE). Specifically, when the terminal (eg, Remote UE) is connected to the Relay UE through L3 relay, the terminal (eg, Remote UE) cannot transmit a NAS message to the Relay UE or cannot receive it from the terminal (eg, Remote UE). Therefore, the network cannot directly transmit control signaling to the Remote UE.

In 5GS, there is an operation in which the network updates the policy of the terminal through NAS signaling. However, when the Remote UE is connected to the network through the L3 relay, NAS signaling between the network and the Remote UE is not supported for the Remote UE, so that the network cannot update the policy of the Remote UE.

In addition, when subscription information (or subscriber information) (eg, subscription information) for the Remote UE is changed, the network should be able to prevent the Remote UE from operating as a Remote UE any longer. However, since the Remote UE is relayed through the Relay UE based on the L3 relay, the network and the Remote UE cannot perform NAS signaling. For this reason, the network cannot perform mobility management for the Remote UE.

SUMMARY

Accordingly, a disclosure of the present specification has been made in an effort to solve the aforementioned problem.

In order to solve the above-mentioned problems, one disclosure of the present specification provides a method for an AMF node to perform communication. The method includes: receiving updated subscriber information of a Remote UE from a UDM node; determining whether to stop service to the Remote UE based on the updated subscriber information of the Remote UE; and transmitting a deregistration request message for requesting deregistration of the Remote UE to a Relay UE communicating with the Remote UE.

In order to solve the above-mentioned problems, one disclosure of the present specification provides a method for a relay UE to perform communication. The method includes: receiving a deregistration request message for requesting deregistration for a Remote UE from an AMF node; and transmitting a connection release request message to the Remote UE based on the reception of the registration release request message.

In order to solve the above problems, one disclosure of the present specification may provide an AMF node for performing communication. The AMF node includes at least one processor; and at least one memory to store an instruction and operably electrically connectable with the at least one processor, wherein an operation performed based on the instruction being executed by the at least one processor is performed from a UDM node. The operation may include receiving updated subscriber information of the Remote UE; determining whether to stop service to the Remote UE based on the updated subscriber information of the Remote UE; and transmitting a deregistration request message for requesting deregistration of the Remote UE to a Relay UE communicating with the Remote UE.

In order to solve the above problems, one disclosure of the present specification may provide a Relay UE for performing communication. The Relay UE includes at least one processor; and at least one memory that stores instructions and is operably electrically connectable with the at least one processor, wherein the operations performed based on the instructions being executed by the at least one processor include: receiving a deregistration request message for requesting deregistration for Remote UE from the AMF node; and transmitting a connection release request message to the Remote UE based on the reception of the registration release request message.

In order to solve the above problems, one disclosure of the present specification may provide an apparatus in mobile communication. The apparatus includes at least one processor; and at least one memory to store an instruction and operably electrically connectable with the at least one processor, wherein the operation performed based on the instruction being executed by the at least one processor comprises: identifying the updated subscriber information of the Remote UE received from a UDM node; determining whether to stop service to the Remote UE based on the updated subscriber information of the Remote UE; and generating a deregistration request message for requesting deregistration of the Remote UE.

In order to solve the above problems, one disclosure of the present specification may provide a non-volatile computer-readable storage medium recording instructions. The instructions, when executed by the one or more processors, include: identifying updated subscriber information of the Remote UE received from the UDM node; determining whether to stop service to the Remote UE based on the updated subscriber information of the Remote UE; and generating a deregistration request message for requesting deregistration to the Remote UE.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 4 is another exemplary diagram showing a structure of a radio interface protocol between a UE and a gNB.

FIGS. 6a and 6b is a signal flowchart illustrating an exemplary PDU session establishment procedure.

DESCRIPTION OF EXEMPLARY EMBODIMENTS

Figure 1:
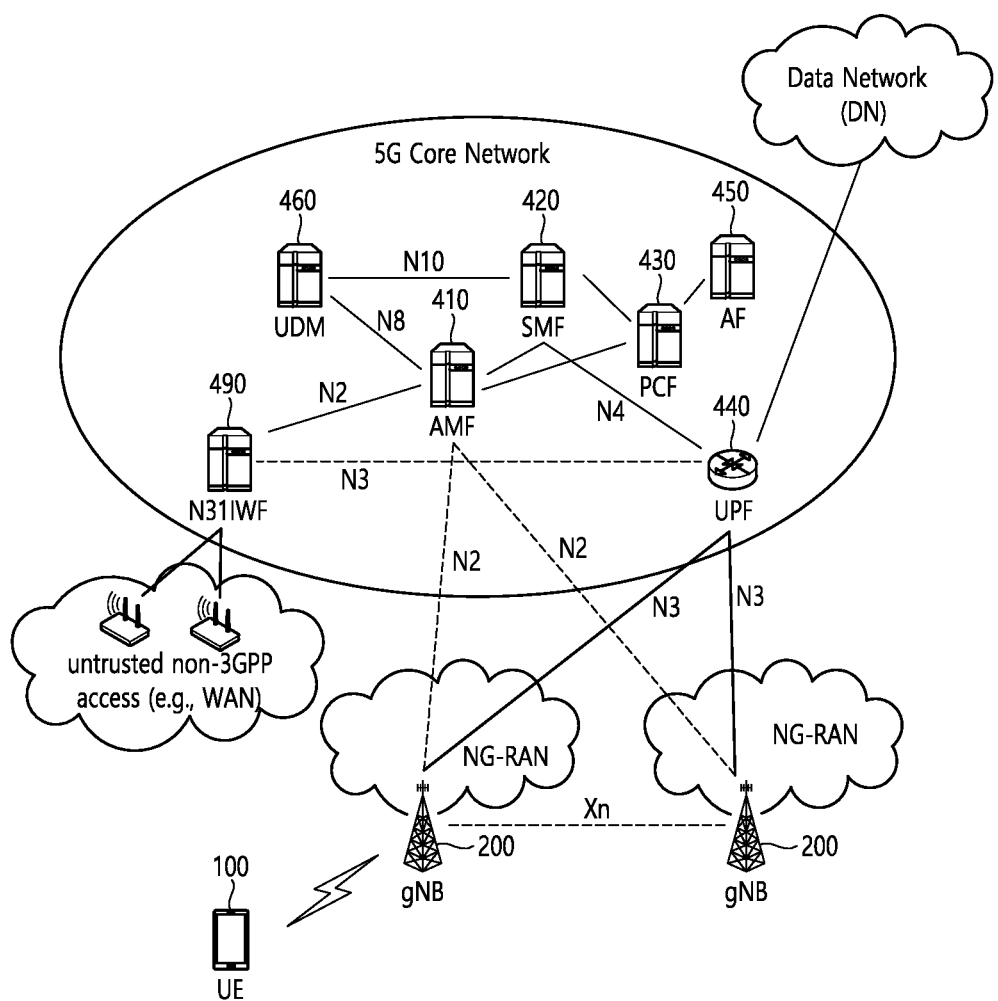
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDCCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

I. Techniques and Procedures Applicable to the Disclosure of the Present Specification FIG. 1 is a Structural Diagram of a Next-Generation Mobile Communication Network.

5GC (5G Core) may include various components, part of which are shown in FIG. 1, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP interworking function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing Non-Access Stratum (NAS) security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The 5$^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW). For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
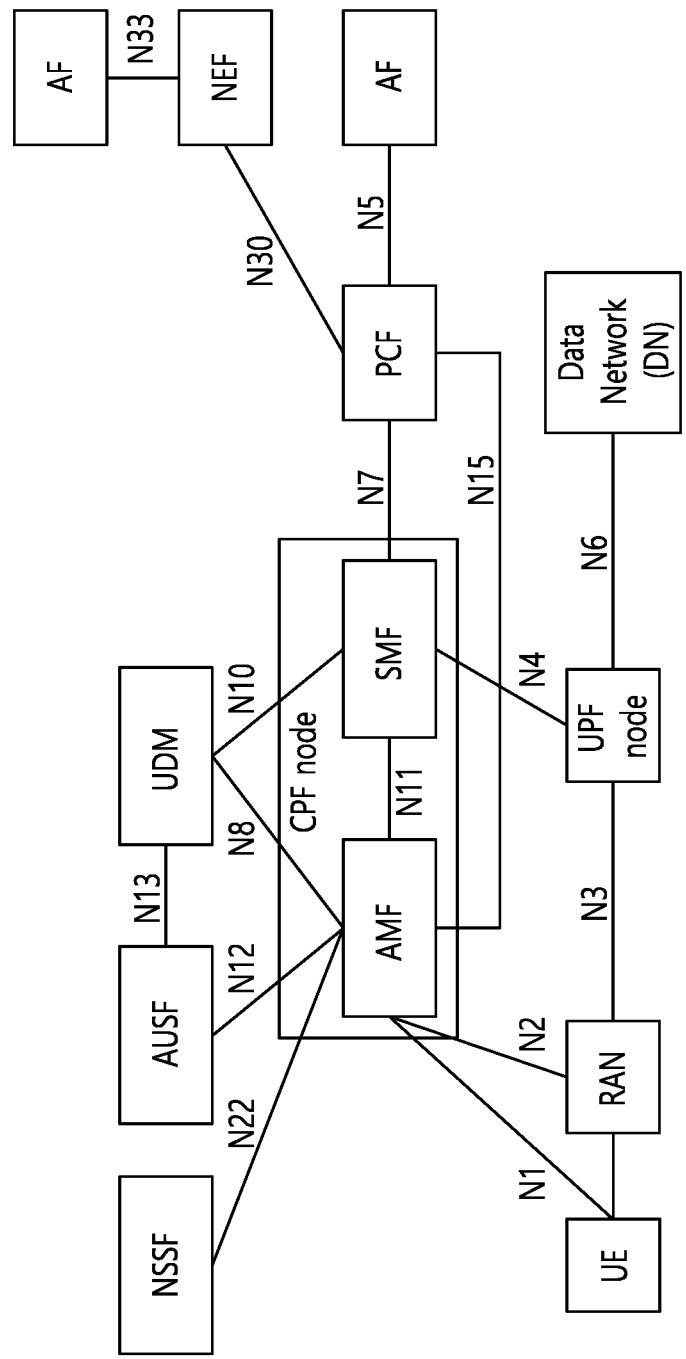
FIG. 2 is an exemplary diagram illustrating a predicted structure of a next generation mobile communication in terms of a node.

FIG. 2 is an exemplary diagram illustrating a predicted structure of a next generation mobile communication in terms of a node. Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
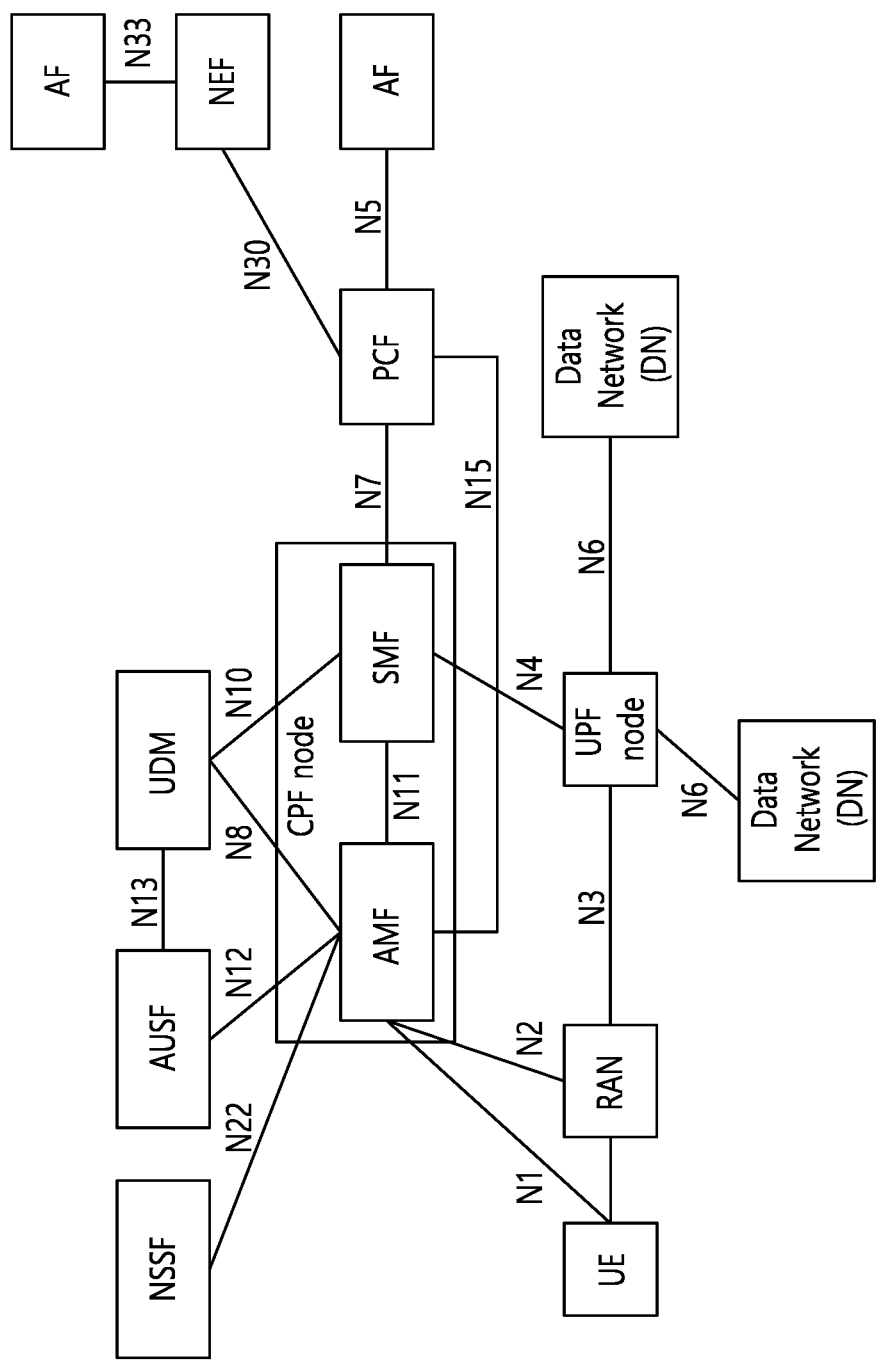
FIG. 3 illustrates an architecture that allows the UE to simultaneously access two data networks using one PDU session.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
The NAS entity for the MM creates a NAS-MM message that derives how and where to deliver an SM signaling message through a security header representing the NAS transmission of SM signaling and additional information on a received NAS-MM.
Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

Figure 5A:
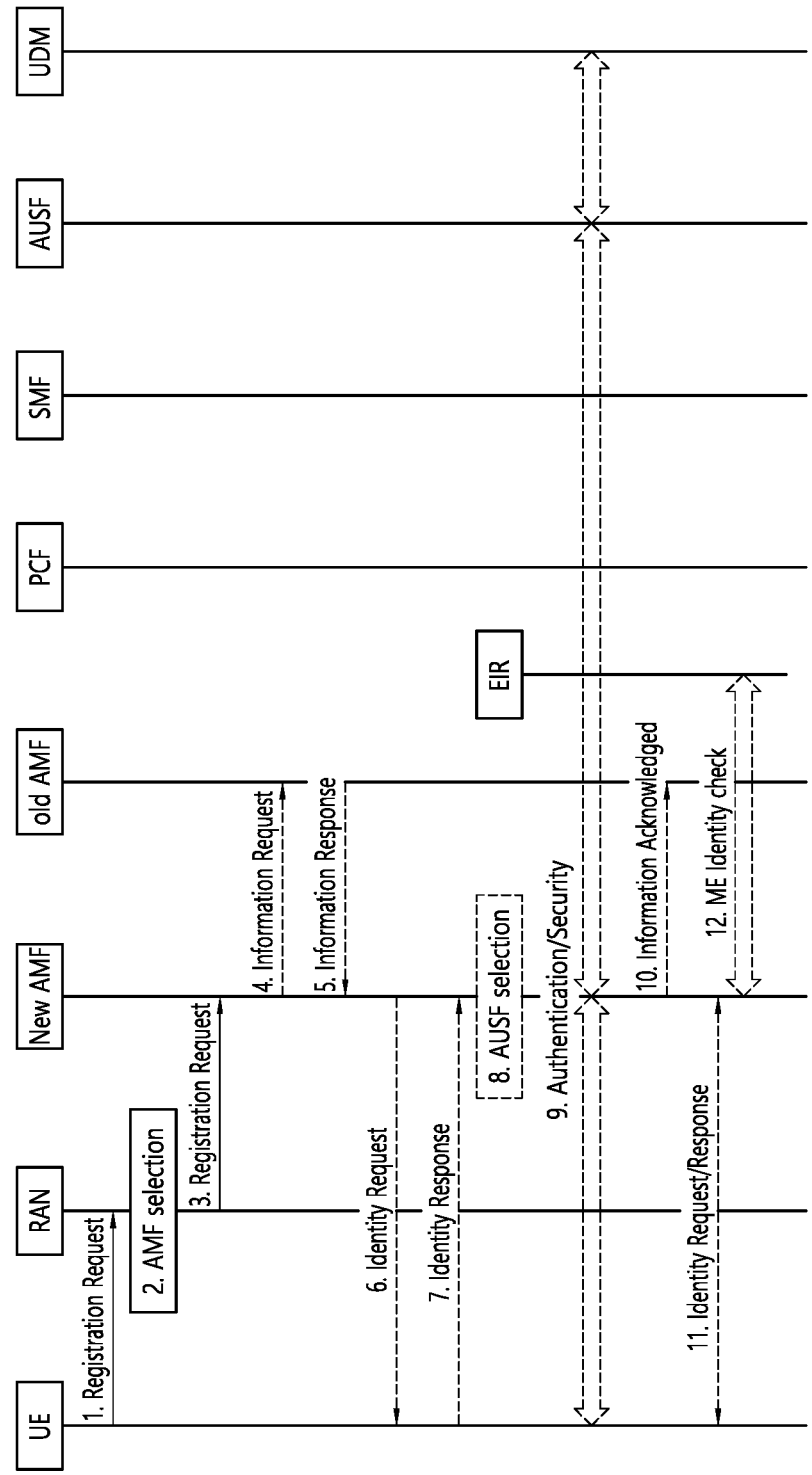
FIGS. 5a and 5b are signal flow charts showing an exemplary registration procedure.
Figure 5B:
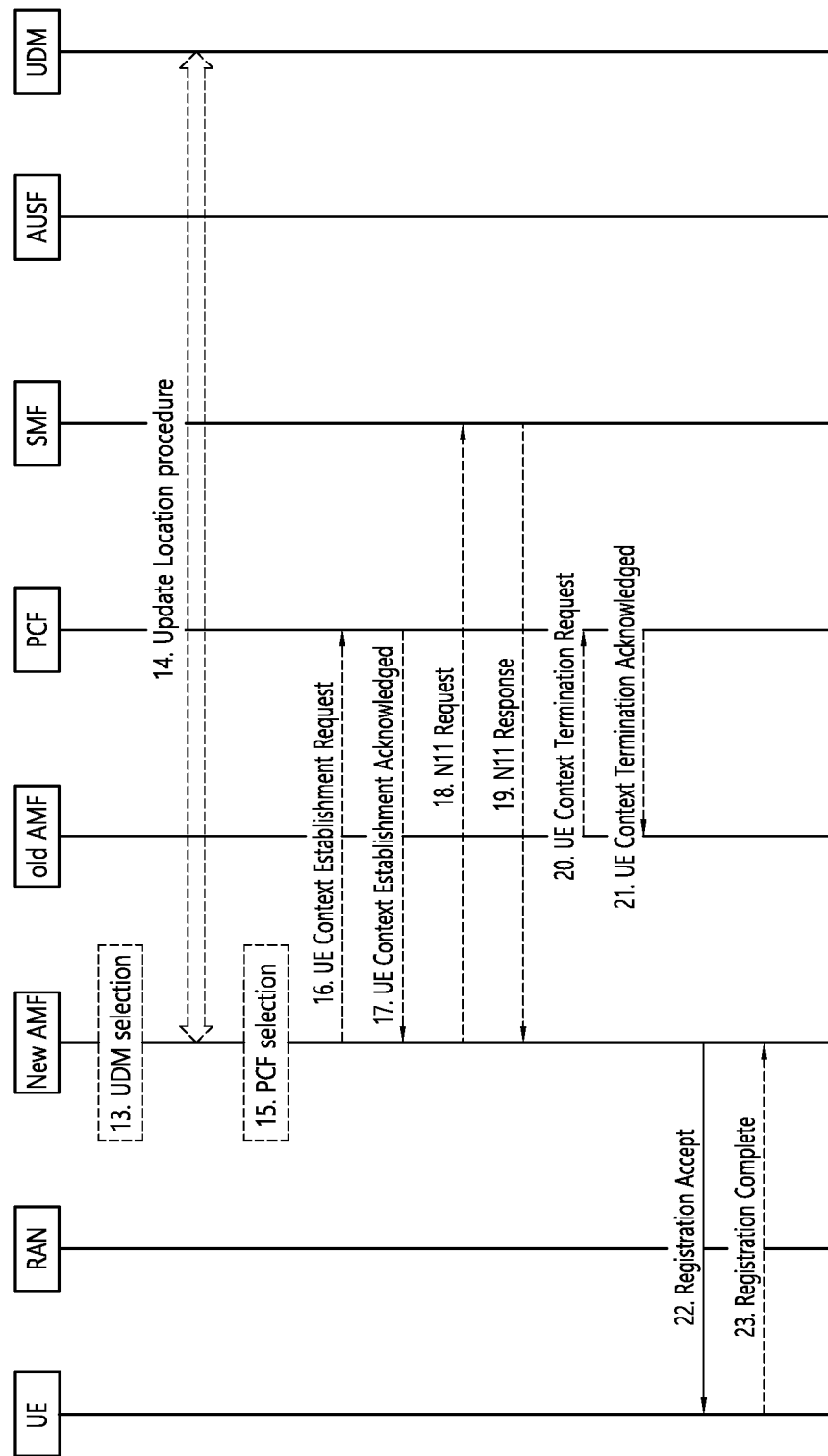

FIGS. 5a and 5b are Signal Flow Charts Showing an Exemplary Registration Procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6B:
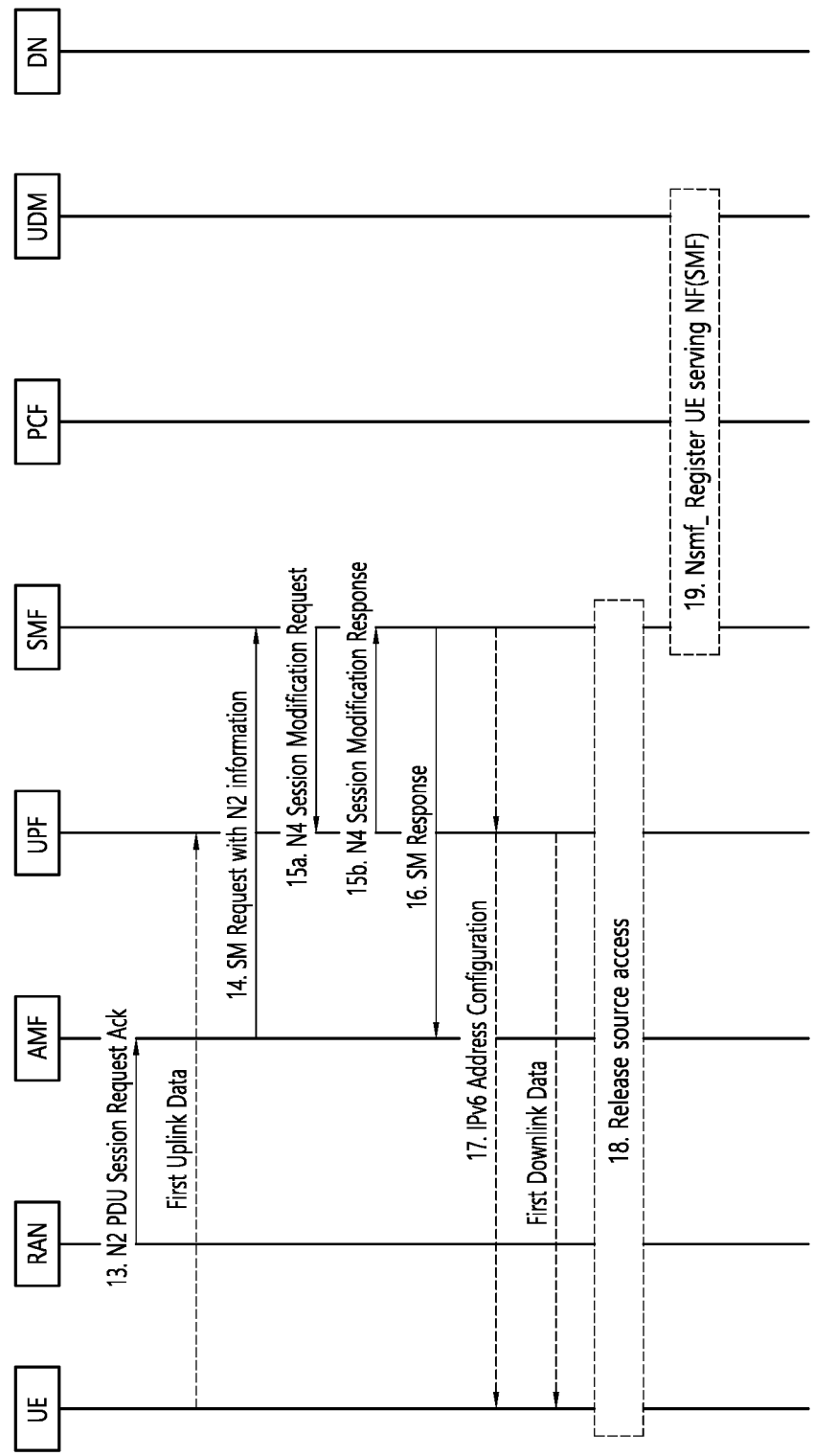

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.
  CN Tunnel information: This corresponds to a core network address of an N3 tunnel corresponding to the PDU session.
  QoS Profile: This is used for providing mapping between a QoS parameter and a QoS flow identifier (QFI) to the RAN.
  PDU Session ID: This may be used for indicating a relation between AN resources for the UE and the PDU session to the UE via AN signaling for the UE.
  Meanwhile, the N1 SM information includes a PDU Session Establishment Accept message that shall be provided to the UE by the AMF.
  Multiple QoS rules may be included in the N1 SM information and the N2 SM information within the PDU Session Establishment Accept message.
  The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<Device to Device (D2D) Communication>

On the other hand, hereinafter, D2D communication will be described.

Figure 7:
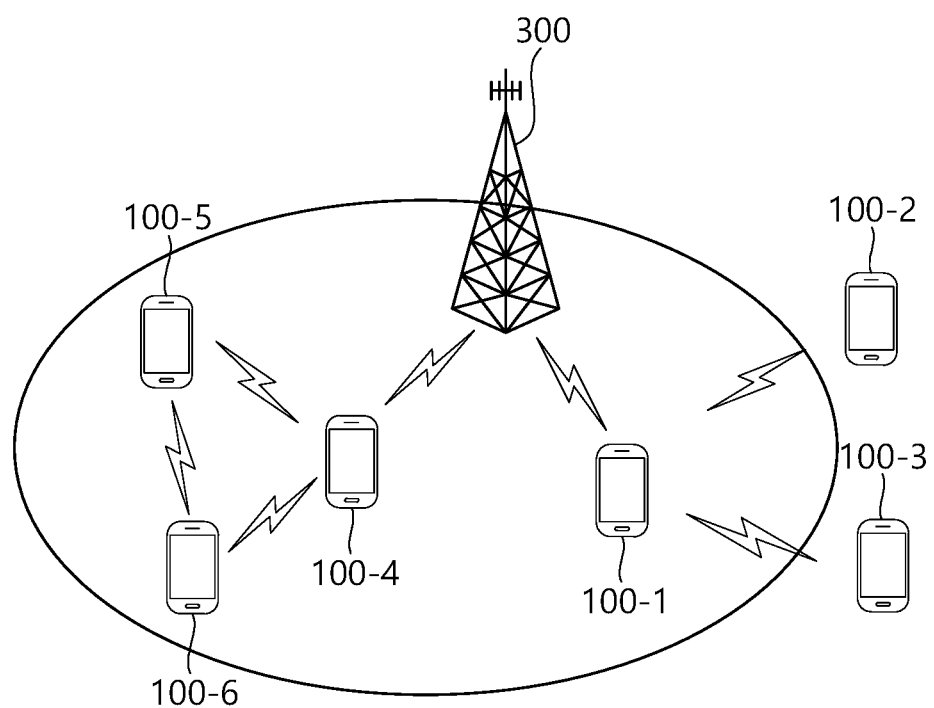
FIG. 7 shows an example of a concept of Device to Device (D2D) communication.

FIG. 7 shows an example of a concept of Device to Device (D2D) communication.

Due to an increase in user requirements for a Social Network Service (SNS), communication between UEs at a physically close distance, i.e., Device to Device (D2D) communication, is required.

In order to reflect the above requirements, as shown in FIG. 7, between UE #1 100-1, UE #2 100-2, UE #3 100-3 or between UE #4 100-4, UE #5 100-5, UE #6 100-6, a method for directly communicating without intervention of a base station (eNodeB) 200 is being discussed. Of course, it is possible to communicate directly between the UE #1 100-1 and the UE #4 100-4 with the help of the base station (gNB) 300. Meanwhile, UE #4 100-4 may serve as a relay for UE #5 100-5 and UE #6 100-6. Similarly, UE #1 100-1 may serve as a repeater for UE #2 100-2 and UE #3 100-3 that are far away from the cell center.

On the other hand, D2D communication is also called a Proximity Service (ProSe). In addition, a UE performing a proximity service is also referred to as a ProSe UE. A link between UEs used for the D2D communication is also called a sidelink.

The physical channels used for the sidelink include the following.
Physical Sidelink Shared Channel (PSSCH)
Physical Sidelink Control Channel (PSSCH)
Physical Sidelink Discovery Channel (PSDCH)
Physical Sidelink Broadcast Channel (PSBCH)

In addition, there are the following physical signals used in the sidelink.
Demodulation Reference signal (DMRS)
Sidelink Synchronization signal (SLSS)

The SLSS includes a Primary Sidelink Synchronization Signal (PSLSS) and a Secondary Sidelink Synchronization Signal (SSLSS).

Figure 8:
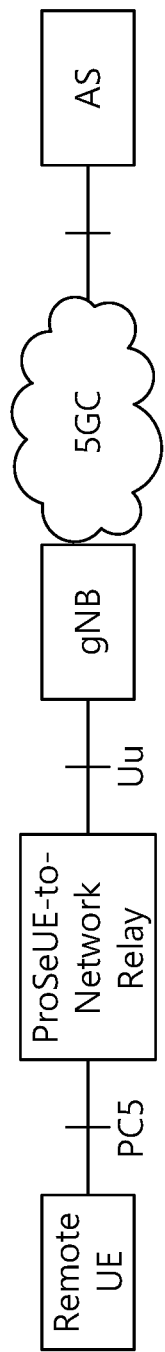
FIG. 8 shows an example of an architecture of a UE-to-Network Relay.
Figure 9:
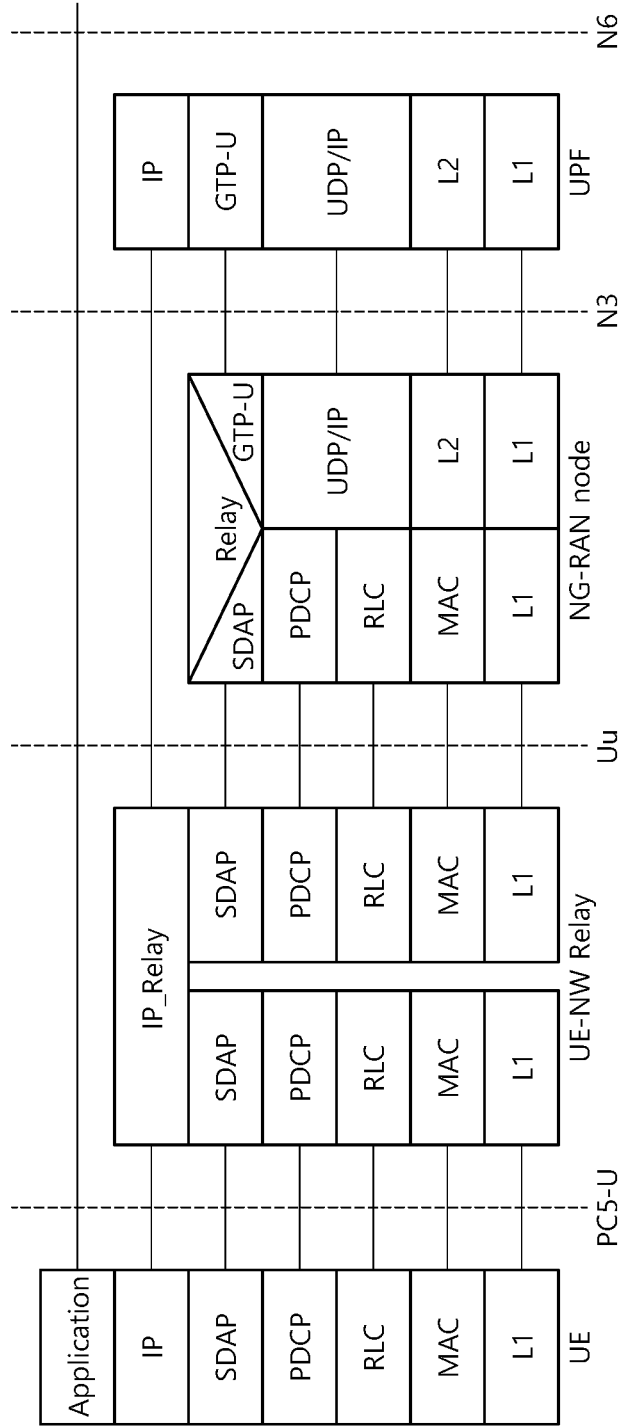
FIG. 9 shows an example of a protocol stack for UE-to-Network Relay.

FIG. 8 shows an example of an architecture of a UE-to-Network Relay. FIG. 9 shows an example of a protocol stack for UE-to-Network Relay.

Referring to FIG. 8, UE-to-Network Relay supports the network connection of the remote UE.

The PC5 link is the interface between the UE and the UE-to-Network Relay. The Uu link is the interface between the UE-to-Network Relay and the base station.

If the UE has established a PC5 link with the UE-to-Network Relay, the UE is considered a remote UE.

The 5G ProSe UE-to-Network Relay entity (refer to 5G ProSe UE-to-Network Relay in FIG. 8) may provide a function for supporting network connectivity for Remote UEs. UE-to-Network Relay may be used for both public safety services and commercial services (eg, interactive services).

When a UE (eg Remote UE) has successfully established a PC5 link to a 5G ProSe UE-to-Network Relay, the UE (eg Remote UE) may be considered as a Remote UE for a specific 5G ProSe UE-to-Network Relay. The Remote UE may be located within NG-RAN coverage or may be located outside NG-RAN coverage.

5G ProSe UE-to-Network Relay may relay unicast traffic (UL and DL traffic) between the Remote UE and the network. The 5G ProSe UE-to-Network Relay shall provide a general function to relay all IP traffic.

For unicast traffic between Remote UEs and 5G ProSe UE-to-Network Relays, One-to-one Direct Communication may be used. The protocol stack of FIG. 9 described above may be a protocol stack for Layer-3 UE-to-Network Relay.

Hop-by-hop security can be supported on PC5 links and Uu links. If there is a requirement beyond hop-by-hop security to protect the traffic of the Remote UE, security through the IP layer may be applied.

In this case, when the remote UE maintains both the PC5 link and the Uu link, the network core entity connected to the Uu link may not be aware of the existence of the PC5 link toward the UE-to-Network Relay.

Communication between the remote UE and the UE-to-Network Relay is performed as one-to-one direct communication.

<Authorization Revocation and Provisioning Update, when UE is not in Coverage>

Support of PC5 authentication and support of provisioning are being discussed to investigate how 5GS will provide and/or update service authentication of UE and provisioning of UE.

The network may provide authentication information and parameters for, for example, discovery and/or communication. Here, the authentication information and parameters may be authentication information and parameters used when a ProSe-enabled UE (eg, a UE capable of ProSe communication) is not in the coverage of the 3GPP RAT.

For example, a ProSe-enabled Public Safety UE (ProSe-enabled Public Safety UE) may be provided with information as in the example below:

Radio parameters for the case that the UE is "not served by E-UTRAN". This radio parameter may include radio parameters having a geographic area that needs to be set so that the UE can perform ProSe Direct Discovery procedures when the UE is "not served by E-UTRAN". These radio parameters (eg, frequency band) may be commonly used for all types of ProSe direct discovery (eg, group member discovery, ProSe UE-to-Network relay discovery, or ProSe UE-to-Network relay discovery additional information). A UE may only use these radio parameters if it is located in that geographic area. Otherwise, the UE may not be authorized to transmit.

For another example, the UE may be provided with information (such as the following examples) for V2X communication through the PC5 reference point:

1) Authentication Policy. When the UE is "not served by E-UTRA" and "not served by NR", specific examples of authentication policies are as follows:

If the UE is "not served by E-UTRA" and "not served by NR", the authentication policy may indicate whether the UE is authorized to perform V2X communication through the PC5 reference point.

Authentication policy, the UE may indicate the RAT (s) authorized to perform V2X communication through the PC5 reference point.

2) Radio parameters when the UE is "not served by E-UTRA" and "not served by NR":

Radio parameters may include the radio parameters per PC5 RAT (i.e. LTE PC5, NR PC5) with Geographical Area(s) and an indication of whether they are "operator managed" or "non-operator managed". Only if the UE can reliably locate itself in the corresponding Geographical Area, when the UE is "not served by E-UTRA" and "not served by NR", the UE may use the radio parameters to perform V2X communication through the PC5 reference point. Otherwise, the UE may not be authorized to transmit.

When authentication information and parameters for out-of-coverage UEs (ie, out-of-coverage UEs) are changed (eg, due to a subscription change), through an update procedure, up-to-date information may be transmitted to the UE. Otherwise, due to out-of-date authentication policies and/or parameters, problems may occur such as the UE cannot access the ProSe service, or the UE misuses radio resources, or the power consumption of the UE is increased, etc. Therefore, providing service authentication and provisioning to the UE should be considered both when the UE is in coverage and when the UE is out of coverage but the UE is reachable via a relay UE.

A general description of support for PC5 authentication and provisioning follows.

For 5GS to provide and/or update service authentication and provisioning, aspects such as the example below should be discussed:

How 5GS provides service authentication and authorization of the UE.

if the UE is in the coverage of the access network, or if the UE is not in the coverage of the access network (eg, the UE is not reachable by the network via the Uu interface) but is reachable via the relay UE, how 5GS revokes the UE's authentication and updates the UE's provisioning.

How to identify information for service authentication and provisioning.

II. Problems to be Solved by the Disclosure of this Specification

Conventionally, when the L3 relay is used, the terminal (eg, Remote User Equipment (UE)) cannot send and receive NAS signaling with the network. For example, when a terminal (eg, Remote User Equipment (UE)) is connected to a 5G network through a relay UE through an L3 relay, the 5G network and/or the DN-AAA server cannot transmit or receive NAS messages to or from the terminal (eg, Remote UE). In other words, it is because when a terminal (eg, Remote UE) is connected to a Relay UE through an L3 relay, the terminal (eg, Remote UE) cannot transmit a NAS message to the Relay UE or receive it from the terminal (eg, Remote UE).

Accordingly, the network could not directly transmit control signaling to the Remote UE.

In 5GS, there is an operation in which the network updates the policy of the terminal through NAS signaling. However, when the Remote UE is connected to the network through the L3 relay, NAS signaling between the network and the Remote UE is not supported for the Remote UE, so that the network cannot update the policy of the Remote UE.

In addition, when subscription information (or subscriber information) (eg, subscription information) for the Remote UE is changed, the network should be able to prevent the Remote UE from operating as a Remote UE any longer. For example, according to the past subscription information, UE #1 could operate as a Remote UE, but the subscription information for UE #1 has changed, so that situations in which UE #1 is not allowed to operate as a Remote UE can occur. In this situation, the network should be able to take action to prevent the Remote UE from acting as a Remote UE anymore. For reference, the subscription information may be changed in situations such as when the user of the Remote UE cancels the service subscription for the operator, or when the user of the Remote UE changes charge plan for the PC5.

According to the prior art (eg, LTE), it was assumed that the Remote UE uses the L3 relay only when related to public safety. For this reason, management of subscriber information for the Remote UE was not particularly important.

Meanwhile, as technology related to 5GS has been discussed, a technology for communicating with a network through an L3 relay for terminals using commercial (commercial) related services has been introduced. For this reason, it has become important to manage the subscriber information of the Remote UE.

However, as described above, since the Remote UE is relayed through the Relay UE based on the L3 relay, the network and the Remote UE cannot perform NAS signaling. For this reason, the network cannot perform mobility management for the Remote UE. In addition, the network cannot manage subscriber information of the Remote UE connected to the network based on the L3 relay. Due to this, when it is necessary to stop the service of the Remote UE due to circumstances such as changing subscriber information of the Remote UE, there is no way for the network to stop the service of the Remote UE.

In the disclosure of the present specification, a method for solving problems such as the examples described above is proposed.

III. Disclosure of the Present Specification

The disclosures described below in this specification may be implemented in one or more combinations. Each of the drawings shows an embodiment of each disclosure, but the embodiments of the drawings may be implemented in combination with each other.

Conventionally, for a Remote UE that communicates with the network based on the L3 relay, the network cannot perform mobility management. However, when mobility management is not performed in the network, a dedicated AMF for exchanging control signaling with a remote UE may not exist in the network. Due to this, the network cannot transmit control signaling to the Remote UE. In order to solve this situation, the following disclosures may be implemented in one or more combinations.

1. First Example of the Disclosure of the Present Specification

A first example of the disclosure of the present specification describes a method for a network to perform mobility management (MM) for a Remote UE.

A Remote UE may receive a service from a network through a UE to Network Relay UE (eg, a Relay UE). In this case, the Remote UE performs a process of generating a direct communication link with the UE to Network Relay UE. In this case, the UE to Network Relay UE (eg, Relay UE) may send the ID information for the Remote UE to the AMF of the UE to Network Relay UE (eg, Relay UE) during the process of generating a direct communication link or after the direct communication link is established.

The AMF (eg, the serving AMF of the Relay UE) may perform the registration procedure for the Remote UE with the UDM after receiving ID information for the Remote UE from the UE to the Network Relay UE (eg, the Relay UE). During the registration procedure, when the UDM receives ID information about the Remote UE from the AMF (eg, the serving AMF of the Relay UE), the UDM may perform deregistration for the serving AMF of the Remote UE that had previously performed the registration procedure for the Remote UE. During the registration procedure, the AMF (e.g., the serving AMF of the relay UE) may perform an operation for preventing the UDM from performing deregistration for serving AMF (i.e., the Remote UE's serving AMF connected via the base station (eg gNB) through the Uu interface) of direct Uu interface for the remote UE. That is, the AMF (eg, the serving AMF of the relay UE) may perform an operation to prevent the UDM from performing deregistration for the serving AMF of the remote UE.

The reason for the operating to prevent the UDM from performing deregistration of the Remote UE's serving AMF is that enabling the Remote UE not to perform initial registration with the deregistered serving AMF again from the beginning when the Remote UE returns to an area with radio coverage. For example, if the UDM deregisters the Remote UE's serving AMF, and when the Remote UE returns to an area with radio coverage, the Remote UE must perform initial registration again with the Remote UE's serving AMF from the beginning. By performing an operation to prevent the UDM from performing deregistration of the Remote UE's serving AMF, when the Remote UE returns to an area with radio coverage, since the Remote UE's serving AMF is registered with the UDM, the Remote UE can quickly switch from communication based on PC5 to communication based on Uu.

For example, to prevent the UDM from performing deregistration of the Remote UE's serving AMF (the AMF directly connected to the Remote UE through the Uu interface), the AMF (e.g., the relay UE's serving AMF) may transmit information (or indication) that the Remote UE is receiving service through the Relay UE or information requesting not to perform deregistration of serving AMF of the Remote UE (AMF directly connected through the Uu interface with the Remote UE), while performing registration procedure about UDM. After the UDM receives information (or indication) that the Remote UE is receiving service through the Relay UE or information requesting not to perform deregistration of serving AMF of the Remote UE (AMF directly connected through the Uu interface with the Remote UE), the UDM recognizes that the Remote UE is being serviced through the Relay UE, and does not perform deregistration for the serving AMF of the Uu interface (that is, the serving AMF of the Remote UE).

An example of a situation in which the aforementioned operation is performed will be described with reference to FIG. 10.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 10:
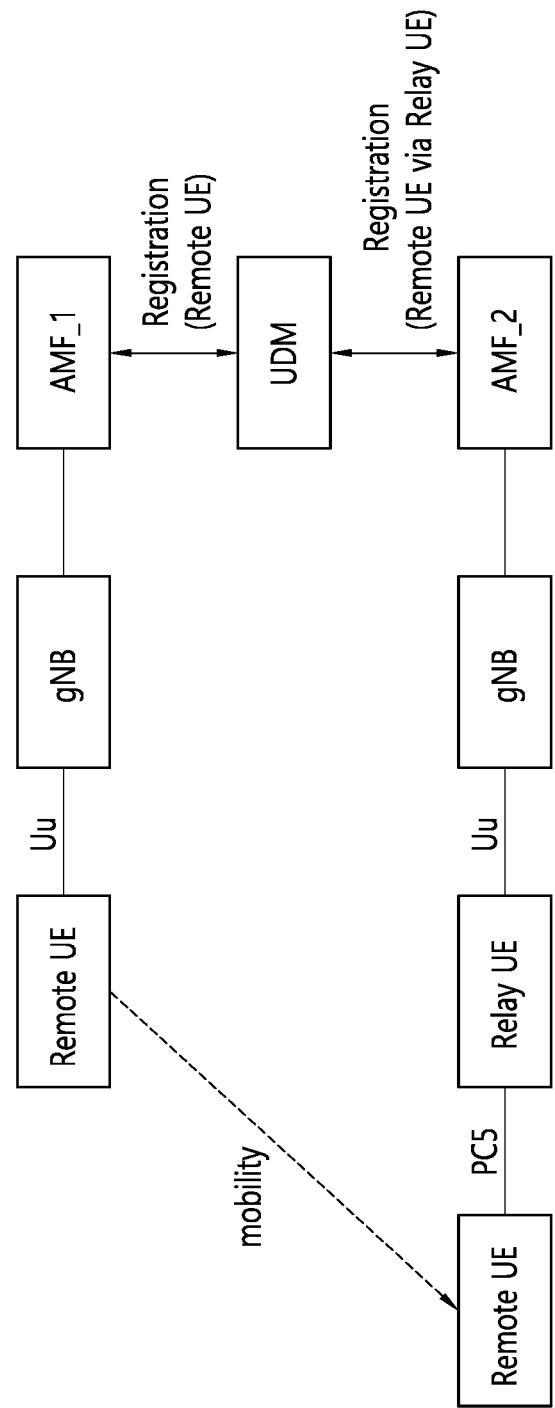
FIG. 10 shows an example of a situation in which registration for a Remote UE is performed in the first example of the disclosure of the present specification.

FIG. 10 Shows an Example of a Situation in which Registration for a Remote UE is Performed in the First Example of the Disclosure of the Present Specification.

In FIG. 10, Remote UE, gNB to which Remote UE is directly connected through Uu interface, AMF_1 (serving AMF of Remote UE, AMF to which Remote UE is directly connected through Uu interface), Relay UE connected to Remote UE through PC5 interface, gNB connected to the Relay UE via the Uu interface, AMF_2 (serving AMF of the Relay UE, AMF connected directly to the Relay UE via the Uu interface), and UDM are shown.

The example shown in FIG. 10 assumes that the Remote UE is connected to a gNB, AMF_1, etc. through a Uu interface to receive a service, but the Remote UE being out of radio coverage. For example, as the Remote UE moves (mobility), it may leave the radio coverage of the gNB to which it was connected through the Uu interface. In this situation, after the Remote UE leaves the radio coverage, it may receive a service through the Relay UE.

At this time, during the process of the Remote UE generating a direct communication link with the Relay UE, or after generating a direct communication link with the Remote UE and the Relay UE, the Relay UE may transmit ID information for the Remote UE (eg, Subscription Permanent Identifier (SUPI), SUCI (Subscription Concealed Identifier), etc.) to AMF_2, which is the serving AMF of the Relay UE. AMF_2 that has received the ID information for the Remote UE may perform the registration procedure for the Remote UE with the UDM. To prevent UDM from performing deregistration for AMF_1, AMF_2 may transmit information (or indication) that the Remote UE is receiving service through the relay UE or information (or an indication) requesting not to perform deregistration for the serving AMF of the Remote UE (AMF_1) to the UDM, while AMF_2 performs the registration procedure with UDM.

Conventionally, when a UE registration request is received from another AMF (eg AMF_2) in a state in which the UE is registered to receive service through another AMF (eg AMF_1) in UDM, the UDM performs deregistration for previous serving AMF (Example: Deregistration of AMF_1) of the UE. However, as described above, when the AMF_2 transmits information (or indication) that AMF_2 requests not to perform deregistration of the Remote UE's serving AMF (AMF_1) or information (or indication) that the Remote UE receives a service through the Relay UE (or indication) to the UDM, the UDM may not perform deregistration of AMF_1. That is, the UDM stores information on one Uu interface AMF (that is, AMF_1 to which the Remote UE was connected through the Uu interface) for the Remote UE and information on the AMF (AMF_2) through another Relay. That is, the UDM may store information on AMF_1 without deregistration of AMF_1, and AMF_1 may store context for the Remote UE.

Hereinafter, an example of a UDM registration procedure for a Remote UE will be described with reference to FIG. 11.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11:
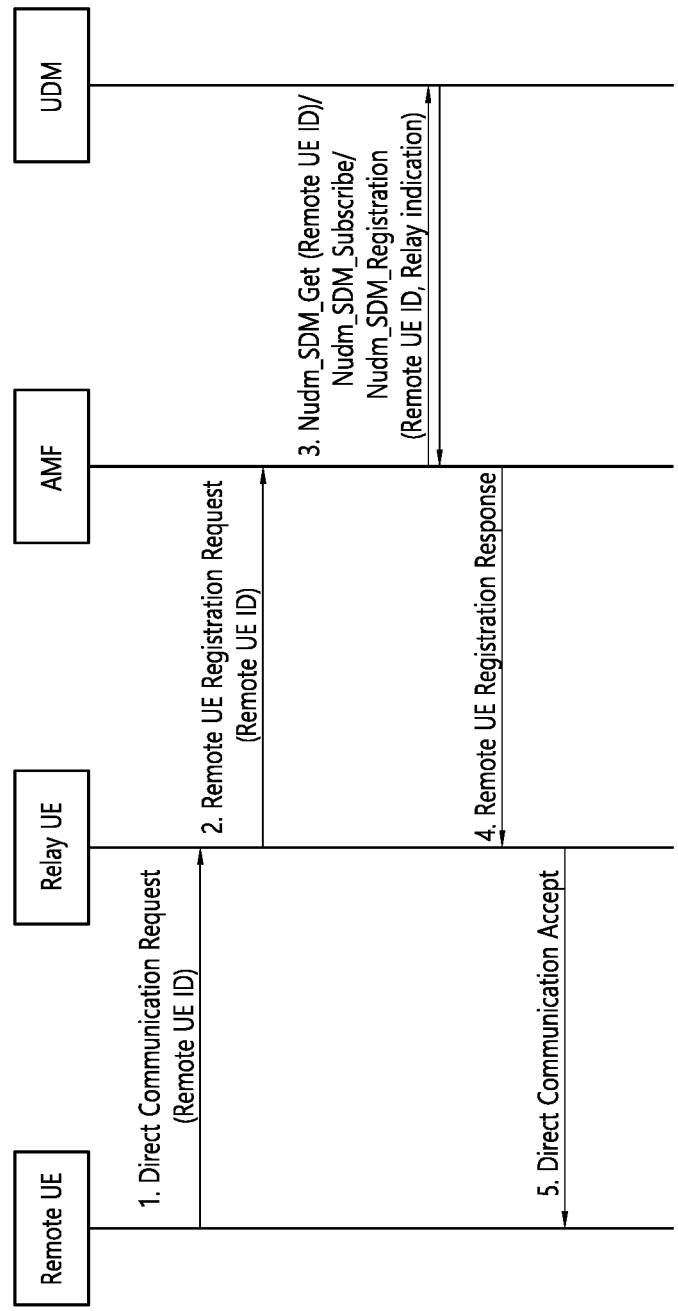
FIG. 11 shows an example of a UDM registration procedure according to a first example of the disclosure of the present specification.

FIG. 11 Shows an Example of a UDM Registration Procedure According to a First Example of the Disclosure of the Present Specification.

FIG. 11 shows a Remote UE, a Relay UE connected to the Remote UE through a PC5 interface, AMF_2 (serving AMF of a Relay UE, AMF connected directly to a Relay UE through a Uu interface), and a UDM. For convenience of explanation, although the relay UE and the gNB connected through the Uu interface are not illustrated in FIG. 11, communication between the Relay UE and the AMF may be performed through the gNB.

1) The Remote UE may transmit a Direct Communication Request message to the Relay UE. The direct communication request message may include ID information of the Remote UE. It may be assumed that the Relay UE performs operations (eg, registration procedure, PDU session establishment procedure, Authorization procedure, and/or Relay UE announcement, etc.) for operating as a Relay UE before step 1) is performed. The Remote UE may find (ie, discover) a Relay UE through the PC5 discovery procedure, and may transmit a communication request message directly to the Relay UE. The Remote UE may directly transmit the communication request message by including its (Remote UE) ID information (eg, SUPI, SUCI, etc.) in the direct communication request message.

2) The Relay UE may transmit ID information of the Remote UE to the AMF. For example, the Relay UE may transmit a Remote UE registration request message including ID information of the Remote UE to the AMF. Additionally, the Relay UE may inform the AMF that the Remote UE has requested a service through itself (Relay UE). For example, the Relay UE may transmit information that the Remote UE has requested a service through itself (Relay UE) to the AMF.

3) AMF may obtain subscriber information of Remote UE from UDM based on ID information of Remote UE received from Relay UE, and may perform a registration procedure for Remote UE with UDM (eg, AMF may transmit Nudm_UECM_Registration message (including Remote UE ID information and relay indication) to UDM). AMF may request subscriber information of Remote UE from UDM based on ID information of Remote UE (eg, AMF may transmit Nudm_SDM_Get message (including ID information of Remote UE) to UDM), and may receive subscriber information of Remote UE from UDM information. And, the AMF may perform a registration procedure for the Remote UE with the UDM. A process in which the AMF obtains subscriber information of the Remote UE may be performed in the same manner as in the prior art. Also, when subscriber information for a remote UE is updated, the AMF may perform subscription to the UDM to receive the updated subscriber information from the UDM (eg, the AMF may transmit a Nudm_SDM_Subscribe message to the UDM). The AMF may transmit information (or indication) that the Remote UE is receiving service through the Relay UE, or information (or indication) that requests not to perform deregistration of the serving AMF of Remote UE (the AMF directly connected to the Remote UE through the Uu interface) to the UDM. In this way, the AMF may prevent the UDM from performing deregistration of the serving AMF of Remote UE (the AMF directly connected to the Remote UE through the Uu interface). After the AMF receives the registration request for the Remote UE, before transmitting the registration request to the UDM, the AMF and the UDM may perform the authentication procedure for the Remote UE in order for the AMF to check the Remote UE.

For reference, the Relay indication shown in FIG. 11 may mean information (or indication) that the Remote UE is receiving service through the Relay UE, or information (or indication) that requests not to perform deregistration of the serving AMF of Remote UE (the AMF directly connected to the Remote UE through the Uu interface).

4) After the AMF successfully completes the registration procedure for UDM and Remote UE (eg, UDM registration procedure), it may transmit a response message to the Relay UE. For example, the AMF may transmit a Remote UE registration response message to the Relay UE.

5) The Relay UE may receive a response message from the AMF. And, the Relay UE may transmit a message for accepting the request for direct communication to the Remote UE. For example, the Relay UE may transmit a direct communication acceptance message to the Remote UE.

After the procedure described according to the example of FIG. 11 is performed, when the Remote UE disconnects the link (eg, a direct communication link) with the Relay UE, the Relay UE may notify the AMF that the connection with the Remote UE is disconnected. The Relay UE may transmit information indicating that the connection with the Remote UE is disconnected to the AMF. For example, a case in which a Remote UE disconnects a link with a Relay UE (eg, a direct communication link) may includes a case in which the Remote UE disconnects a link with a Relay UE to use the Uu interface again, a case in which the PC5 link is disconnected due to the distance between the Remote UE and the Relay UE increases.

When the AMF receives the information indicating that the connection with the remote UE is disconnected, the AMF may recognize that the connection between the remote UE and the relay UE is disconnected. And, if the PCF association related to the Remote UE exists, the AMF may terminate the PCF association. For reference, for the description of PCF association related to the Remote UE, refer to the second example of the disclosure of the present specification to be described later. When the connection with the Remote UE (ie, the connection between the Remote UE and the Relay UE) is disconnected, the AMF may store the context of the Remote UE without immediately deleting the context of the Remote UE. For example, the AMF may be stored without deleting the context of the Remote UE for a preset time (eg, 2 minutes) or a time set by the operator (eg, 2 minutes). Thereafter, when the AMF desires to delete the context of the Remote UE, the AMF may not receive the subscriber information update for the Remote UE from the UDM by requesting the UDM to deregister.

2. Second Example of the Disclosure of the Present Specification

A second example of the disclosure of the present specification describes a method for supporting policy update.

According to the first example of the disclosure of the present specification, after the AMF registers the Remote UE with the UDM, the AMF may create a UE Policy Association for the PCF and the Remote UE. The AMF may decide to create a UE Policy Association according to the prior art. For example, when the Remote UE provides a Policy Section Identifier (PSI) to the AMF, according to a local configuration, or according to a UDM subscription, the AMF may determine to create a UE Policy Association.

Through the AMF's decision, a UE Policy Association may be created. Then, the PCF can update the policy for the Remote UE if the PCF desires. In order for the AMF to create a UE Policy Association and/or for the PCF to update the policy for the Remote UE, the Remote UE transmits a Policy Container to the Relay UE in the process of creating a direct communication link with the Relay UE. Here, the policy container may be the same as the policy container included when the UE transmits a registration request message in the prior art.

The Policy Container may include the PSI for the Policy that the UE (Remote UE) has. In addition, when the AMF performs a process of creating a PCF and UE policy association, the AMF may transmit an indication (or information) indicating that a terminal (remote UE) receives a service through a relay UE to the PCF.

Upon receiving the indication (or information) indicating that the terminal (Remote UE) receives the service through the Relay UE, if the PCF determines that the policy update for the Remote UE is necessary, the PCF may transmit the updated policy according to the prior art to the terminal (Remote UE).

At this time, since the PCF knows that the Remote UE is serviced through the Relay UE, the PCF may apply security to the updated policy and transmit the security-applied policy to the UE. For example, when the PCF transmits an updated policy to the terminal, the PCF may use a method used in the prior art Steering of Roaming (SoR).

Hereinafter, an example of a procedure for updating the policy of the Remote UE will be described with reference to FIG. 12.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 12:
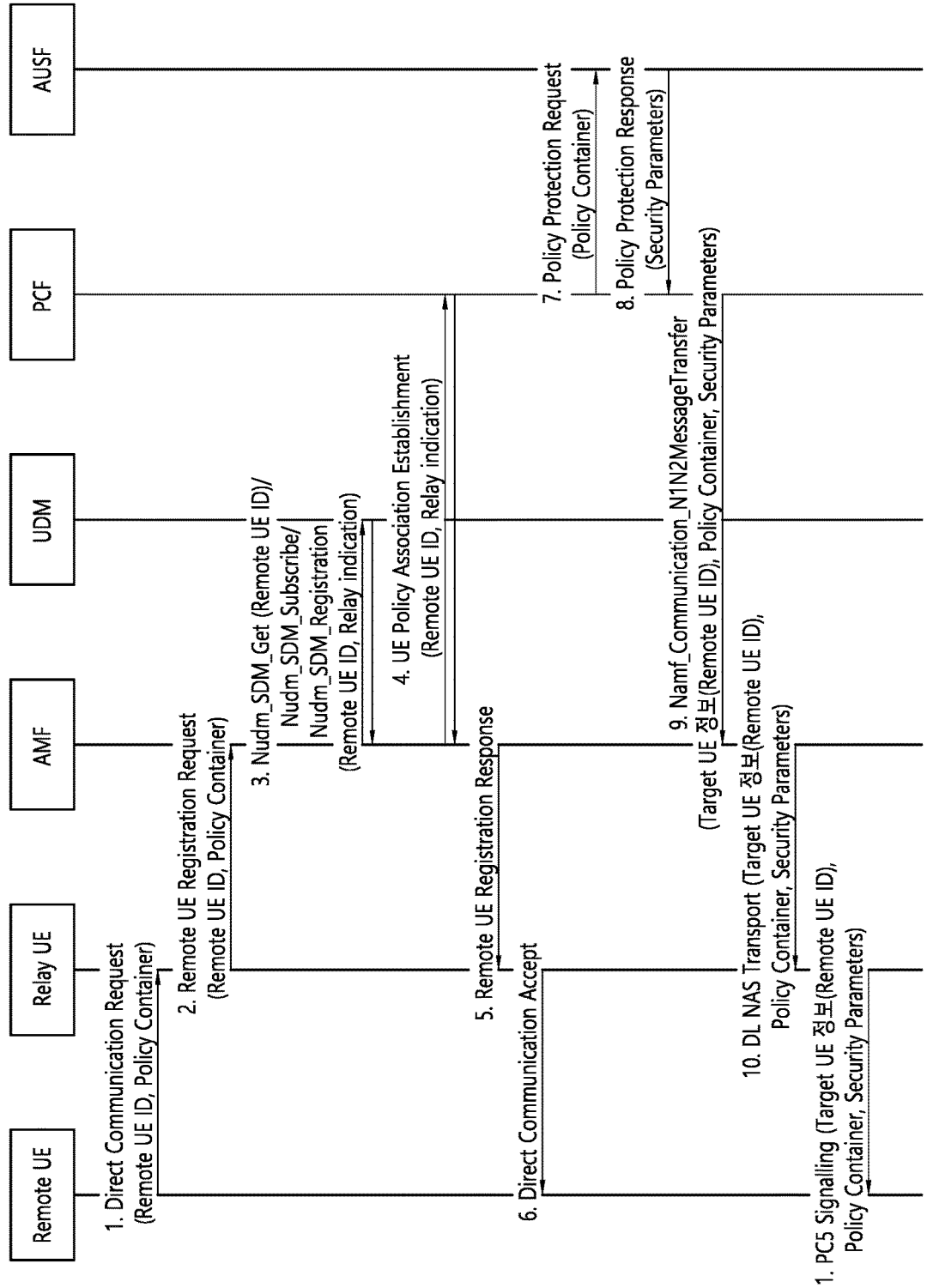
FIG. 12 shows an example of a procedure for updating a Policy of a Remote UE according to a second example of the disclosure of the present specification.

FIG. 12 Shows an Example of a Procedure for Updating a Policy of a Remote UE According to a Second Example of the Disclosure of the Present Specification.

FIG. 12 shows Remote UE, Relay UE, AMF, UDM, PCF, and Authentication Server Function (AUSF).

1) It is assumed that the Relay UE performs operations (eg, registration procedure, PDU session establishment procedure, Authorization procedure, and/or Relay UE announcement, etc.) to operate as a Relay UE before step 1) is performed. The Remote UE may find (ie, discover) a Relay UE through the PC5 discovery procedure, and may transmit a direct communication request message to the Relay UE. The Remote UE may transmit the direct communication request message by including its (Remote UE) ID information (eg, SUPI, SUCI, etc.) in the direct communication request message. In addition, when there is a policy that the remote UE received from the network and stores it, the remote UE may include PSI information in a policy container and transmit it to the relay UE. For example, the Remote UE may transmit a direct communication request message including the ID information of the Remote UE and the policy container to the Relay UE.

2) The Relay UE may transmit ID information of the Remote UE to the AMF. For example, the Relay UE may transmit a Remote UE registration request message including ID information of the Remote UE to the AMF. Additionally, the Relay UE may inform the AMF that the Remote UE has requested a service through itself (Relay UE) while transmitting ID information of the Remote UE to the AMF. If there is a policy container received from the Remote UE, the Relay UE may transmit it to the network (eg, AMF).

3) AMF may obtain subscriber information of Remote UE from UDM based on ID information of Remote UE received from Relay UE, and may perform a registration procedure for Remote UE with UDM (eg, AMF may transmit Nudm_UECM_Registration message (including Remote UE ID information and relay indication) to UDM). AMF may request subscriber information of Remote UE from UDM based on ID information of Remote UE (eg, AMF can send Nudm_SDM_Get message (including ID information of Remote UE) to UDM), and may receive subscriber information of Remote UE from UDM. And, the AMF may perform a registration procedure for the Remote UE with the UDM. A process in which the AMF obtains subscriber information of the Remote UE may be performed in the same manner as in the prior art. Also, when subscriber information for a remote UE is updated, the AMF may subscribe to the UDM to receive the updated subscriber information from the UDM (eg, the AMF may transmit a Nudm_SDM_Subscribe message to the UDM). The AMF may transmit information (or indication) that the Remote UE is receiving service through the Relay UE, or information (or indication) that requests not to perform deregistration of the serving AMF of Remote UE (the AMF directly connected to the Remote UE through the Uu interface) to the UDM. In this way, the AMF can prevent the UDM from performing deregistration of serving AMF of the Remote UE (the AMF directly connected to the Remote UE through the Uu interface). After the AMF receives the registration request for the Remote UE, before sending the registration request to the UDM, the AMF and the UDM can perform the authentication procedure for the Remote UE in order for the AMF to check the Remote UE.

4) The AMF may create (or establish) a UE Policy Association for the Remote UE with the PCF. In the process of the AMF establishing the UE Policy Association with the PCF, the AMF may transmit information (or an indication) indicating that the Remote UE is receiving a service through the Relay UE (Relay indication in the example of FIG. 12) to the PCF. For example, the AMF may transmit a UE Policy Association Establishment (Establishment) request message including a Relay indication and ID information of the Remote UE to the PCF. The AMF may receive a response message accepting UE Policy Association establishment from the PCF.

5) The AMF may transmit a response message to the Relay UE after successfully completing the registration procedure for UDM and Remote UE (eg, UDM registration procedure). For example, the AMF may transmit a Remote UE registration response message to the Relay UE.

6) The Relay UE may receive a response message from the AMF. And, the Relay UE may transmit a message for accepting the request for direct communication to the Remote UE. For example, the Relay UE may transmit a direct communication accept message to the Remote UE.

7 and 8) The PCF may determine the Policy Update for the Remote UE. Security can be applied to the policy information to be transmitted by the PCF to the remote UE. In this case, in order for the PCF to apply security to the policy information, the PCF may perform integrity protection through the AUSF. A process in which the PCF performs integrity protection through the AUSF may be performed based on a process similar to the prior art Steering of Roaming (SoR).

For example, the PCF may transmit a policy container to be transmitted to the Remote UE to the AUSF. Then, the AUSF may transmit a security parameter that can be used to perform an integrity check to the PCF. In other words, the PCF may transmit a policy protection request message including the policy container to the AUSF. The AUSF may transmit a policy protection response message including security parameters to the PCF.

9) The PCF may transmit the Policy Container to the Remote UE in the same manner as in the prior art for Policy Update to the Remote UE. For example, the PCF may transmit a Namf_Communication_N1N2MessageTransfer message to the AMF. PCF may transmit target UE information (eg, ID information of Remote UE (e.g. SUPI, SUCI, 5G-GUTI (Global Unique Temporary Identifier), etc.)) to inform the AMF that the policy container transmitted is for the Remote UE. Also, when the PCF applies security to the policy container, the PCF may transmit the security parameters received from the AUSF to the AMF together. For example, the PCF may transmit a Namf_Communication_N1N2MessageTransfer message including target UE information (eg, remote UE ID information (e.g. SUPI, SUCI, 5G-GUTI, etc.)), a policy container, and a security parameter to the AMF.

10) The AMF may determine to which Remote UE to transmit the Policy Container based on the target UE information received from the PCF. The AMF searches for the Relay UE serving the Remote UE, and the AMF may transmit the Policy Container, Target UE information, and Security Parameters to the corresponding Relay UE. For example, the AMF may transmit a DL NAS Transport message including Policy Container, Target UE information, and Security Parameter to the Relay UE.

11) The Relay UE may transmit Policy Container, Target UE, and Security Parameters to the Remote UE based on Target UE information. For example, the Relay UE may transmit a message including a policy container, a target UE, and security parameters to the remote UE through PC5 signaling based on ID information of the remote UE included in the target UE information.

The Remote UE may recognize that the received Policy Container is its own (Remote UE) Policy Container based on the received Target UE information. When the Remote UE receives the Security Parameter, it may perform an integrity check on the Policy Container using its own (Remote UE) Security Key value (eg, a Security Key value stored in advance in the Remote UE). When the integrity check performed by the Remote UE is successful, the Remote UE may store the updated policy included in the Policy Container. When the PCF requests an acknowledgment for the Policy Container, the Remote UE may transmit an acknowledgment message to the Relay UE through PC5 signaling. Here, the acknowledgment message transmitted to the Relay UE may include ID information of the Remote UE. The relay UE may transmit an acknowledgment message to the AMF, and the AMF may transmit an acknowledgment message to the PCF.

The Remote UE may wish to initiate UE policy/Parameter update. When the Remote UE wants to request a UE triggered UE Policy/Parameter update, the Remote UE may transmit a request message including a Policy Container to the Relay UE. In this case, the Relay UE may transmit a request message including information about the Remote UE (eg, ID information of the Remote UE) and the Policy Container to the AMF. In addition, the AMF may transmit this to the PCF so that the PCF may perform UE policy/parameter update.

3. Third Example of the Disclosure of the Present Specification

A third example of the disclosure of the present specification describes a method for stopping a service for a Remote UE when subscriber information of a Remote UE is changed.

A first example of a third example of the disclosure of the present specification will be described with reference to FIG. 13. A first example of a third example of the disclosure of the present specification may include an operation performed when the UDM notifies the AMF of a change in subscriber information.

According to the method described in the first example of the disclosure of the present specification, when the AMF for the Remote UE is registered in the UDM, when the subscriber information is changed, the UDM may transmit the changed subscriber information to the AMF. Upon receiving the changed subscriber information, the AMF may determine whether to continue servicing the Remote UE based on the changed subscriber information. If the AMF intends to stop the service to the Remote UE, the AMF may instruct the Relay UE to stop the service to the Remote UE.

A specific example of the first example of the third example of the disclosure of the present specification will be described with reference to FIG. 13.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
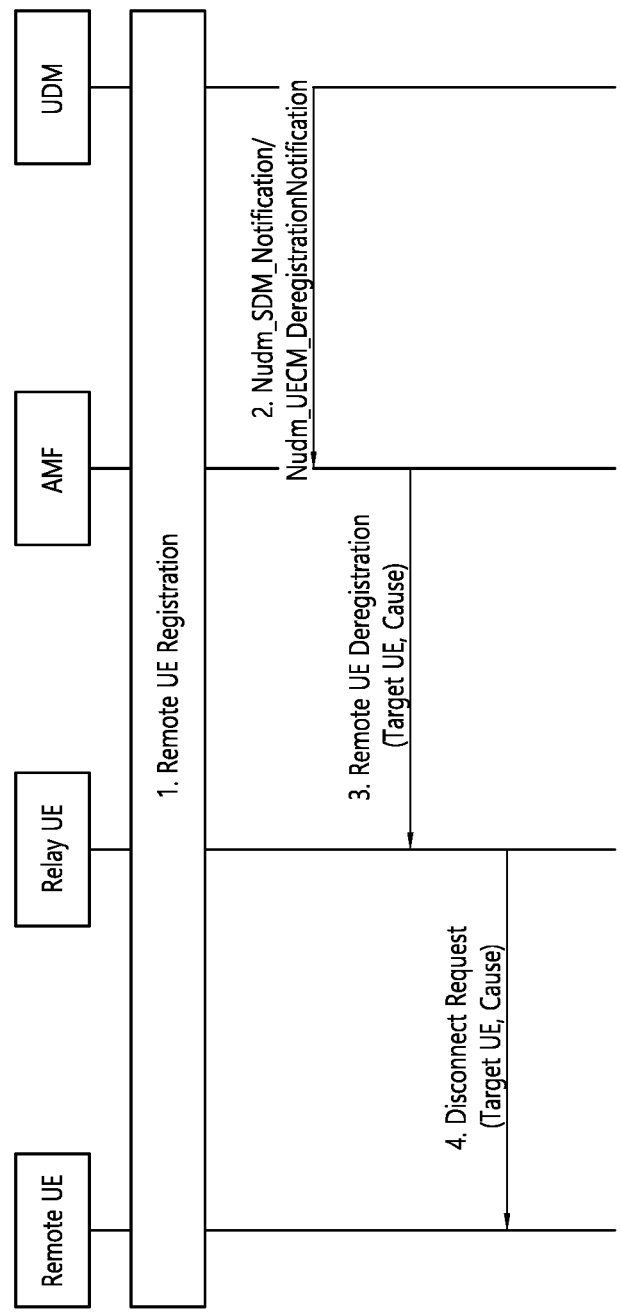
FIG. 13 shows a signal flow diagram according to a first example of a third example of the disclosure of the present specification.

FIG. 13 shows a signal flow diagram according to a first example of a third example of the disclosure of the present specification;

FIG. 13 shows a Remote UE, a Relay UE, an AMF, and a UDM.

FIG. 13 shows an example of a procedure in which the AMF stops the service to the Remote UE when subscriber information for the Remote UE is changed.

1) As described in the first example of the disclosure of this specification, it is assumed that the Remote UE is registered with UDM through AMF. For a detailed operation of the Remote UE performing the UDM-related registration procedure, refer to FIG. 10 and the first example of the disclosure of the present specification.

2) When the subscriber information for the Remote UE is updated, the UDM may inform the AMF of the updated subscriber information. For example, the UDM may transmit a Nudm_SDM_Notification message including updated subscriber information (eg, subscriber information on the Remote UE) to the AMF. When subscriber information is withdrawn (eg, a subscriber of the Remote UE leaves the service of the operator), the UDM may notify the AMF of deregistration for the Remote UE. For example, the UDM may transmit to the AMF a Nudm_UECM_DeregistrationNotification message including information notifying the AMF of deregistration for the Remote UE.

3) The AMF may determine whether to stop the service to the Remote UE based on the changed (or updated) subscriber information. For example, the AMF may decide to stop the service to the Remote UE based on the changed (or updated) subscriber information. In this case, the AMF may find a Relay UE serving (serving) the Remote UE, and instruct the Relay UE to deregistration for the Remote UE. For example, the AMF may transmit a deregistration request message (eg, a Remote UE Deregistration message) to the Relay UE. In this case, the registration deregistration request message may include target UE information (e.g. SUCI, SUPI, 5G-GUTI, etc.) and a cause value. For example, the cause value may include information that subscriber information of the Remote UE is changed (or updated).

4) The Relay UE may transmit a PC5 Disconnect Request message to the Remote UE in order to disconnect a link with the Remote UE (eg, a PC5 link such as a direct communication link). The PC5 Disconnect Request message may include information of the target UE and the cause received from the AMF.

Hereinafter, a second example of a third example of the disclosure of the present specification will be described with reference to FIG. 14.

The second example of the third example of the disclosure of the present specification may include an operation of informing the existence of Remote UE to SMF/PCF (SMF and/or PCF) and stopping the service of the Remote UE through SMF/PCF in the process of creating a direct communication link, when subscriber information is updated, when the Remote UE receives a service through the Relay UE.

A specific example of the second example of the third example of the disclosure of the present specification will be described with reference to FIG. 14.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 14A:
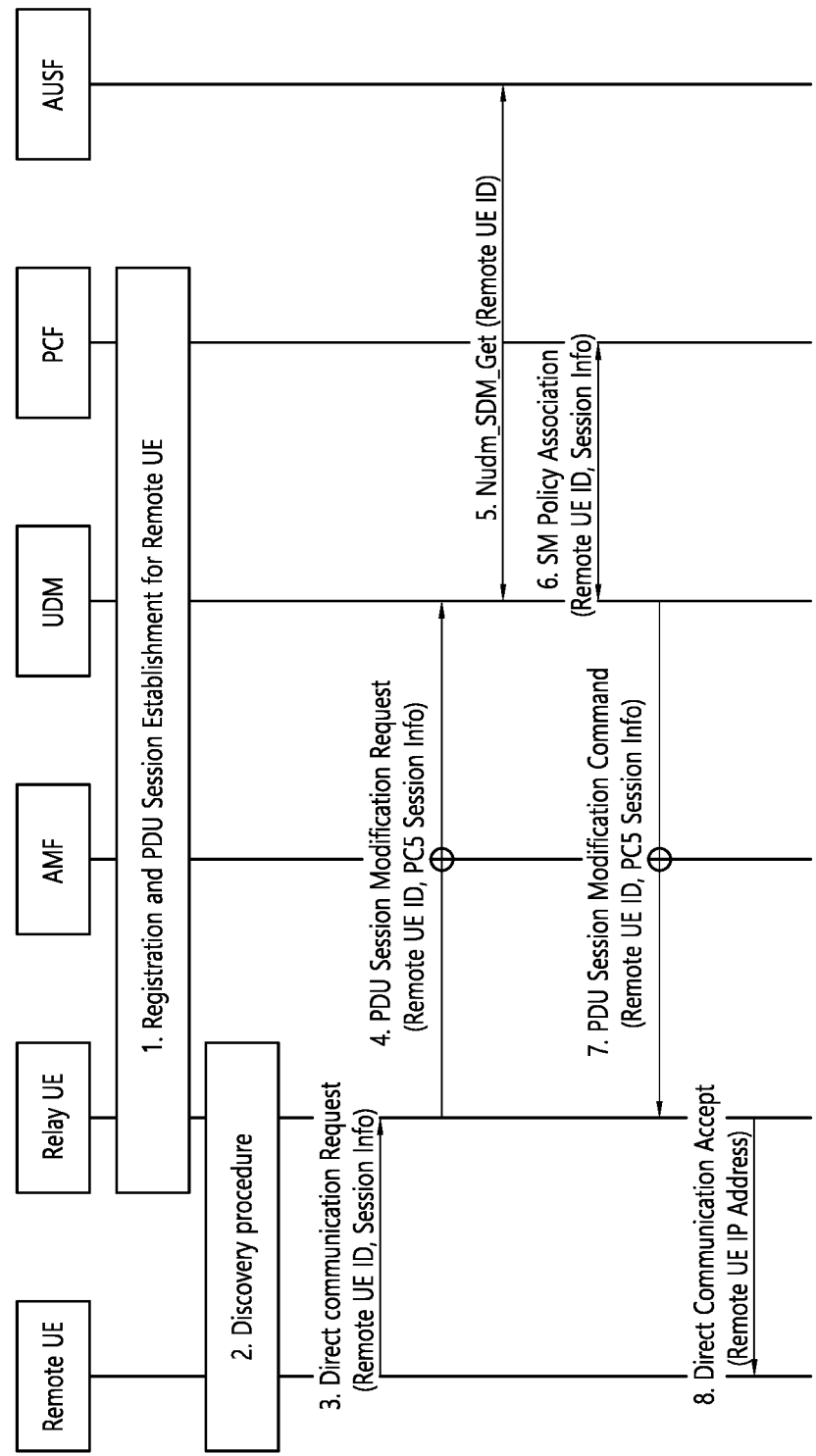
FIGS. 14a and 14b show a signal flow diagram according to a second example of a third example of the disclosure of the present specification.
Figure 14B:
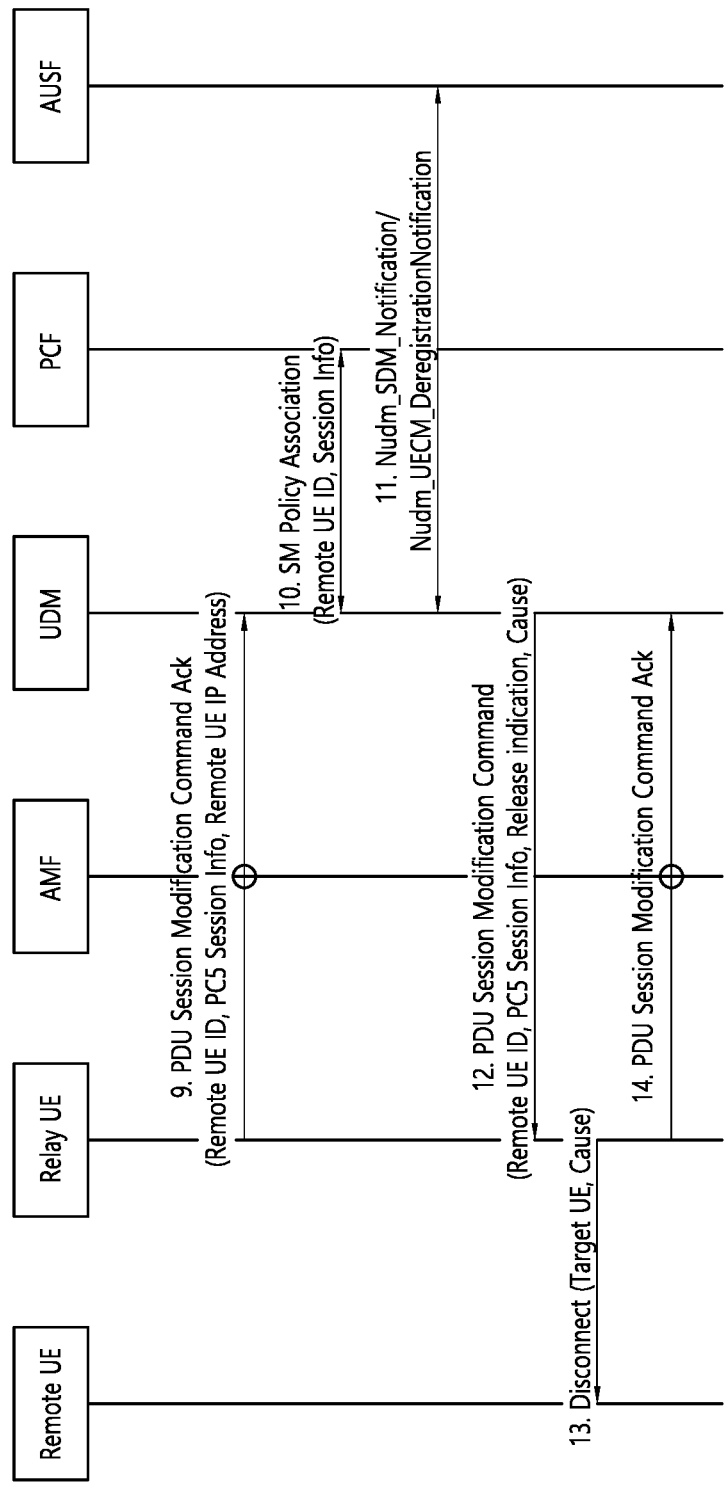

FIGS. 14a and 14b Show a Signal Flow Diagram According to a Second Example of a Third Example of the Disclosure of the Present Specification.

FIGS. 14a and 14b show Remote UE, Relay UE, AMF, SMF, PCF, and UDM.

FIGS. 14a and 14b show a procedure for stopping the service for the Remote UE by the SMF and/or PCF when the subscriber information for the Remote UE is changed.

1) The Relay UE may perform a procedure of creating (or establishing) a PDU Session for relay and a registration procedure for performing a relay operation for a Remote UE.

2) The Remote UE may discover (or discover) a Relay UE using a discovery procedure.

3) The Remote UE may transmit a direct communication request message to the Relay UE in order to use the relay service. The direct communication request message may include the ID information of the Remote UE and information about the session for which the Remote UE wants the service (PC5 session information) (eg, DNN (Data Network Name), S-NSSAI, ID to distinguish PC5 Session, etc.). For reference, SUPI, SUCI, or a temporary ID (e.g. 5G-GUTI) previously assigned to the Remote UE by AMF may be used as ID information of the Remote UE. In order to distinguish the temporary ID assigned by SUPI, SUCI, or AMF, the Remote UE may transmit type information of ID together.

4) The Relay UE may transmit a PDU Session Modification Request message to the SMF through the AMF. The PDU session modification request message may include ID information of the Remote UE and PC5 session information. At this time, in order to inform that the Relay UE starts the relay for the Remote UE, Relay UE may include ID information and PC5 session information (eg, session information transmitted by the UE (eg, session information that the Remote UE wants to receive service e.g. DNN, S-NSSAI)+ PC5 session information for identifying the session requested by the Remote UE (eg, information for identifying the link created in the PC5 link e.g. PC5 link id)) in the PDU session modification request message. If the Remote UE provided information for secondary authentication to the relay UE, the Relay UE may include information for secondary authentication in the PDU session modification request message and transmit the PDU session modification request message.

For reference, the secondary authentication/authorization may be performed by the Data Network-Authentication, Authorization, Accounting (DN-AAA) server while the PDU session establishment (or modification) procedure is performed. The secondary authentication/authorization may mean authentication/authorization through a data network (DN) outside the mobile carrier domain. A DN-AAA server may belong to 5GC or DN.

If the relay UE does not have a PDU Session created (or established) in advance in step 1), the Relay UE may transmit a PDU Session Establishment Request message instead of a PDU session modification request message. For example, the Relay UE may establish (or create) a session for Remote UE, by including the ID information of the Remote UE and PC5 session information in the PDU session establishment request message, while generate PDU session (PDU session for Relay) by transmitting PDU session establishment request message.

Step 5. SMF obtains subscription information of Remote UE from UDM based on ID information of Remote UE (eg, SMF may transmit Nudm_SDM_Get message (including ID information of Remote UE) to UDM), in order to receive updated subscriber information from the UDM, SMF may perform a subscription to the UDM (eg, the SMF may transmit a Nudm_SDM_Subscribe message to the UDM).

6) The SMF transmits ID information and session information of the Remote UE to the PCF, so that the SMF may notify information on the Remote UE serviced by the SMF and information on the session used by the Remote UE. For reference, step 6) may be performed together when step 10) is performed.

7 and 8) The SMF may inform the Remote UE that the service is allowed. For example, the SMF may transmit a PDU session modification command message (including ID information of the Remote UE and PC5 session information) to the Relay UE via the AMF. Then, the Relay UE may transmit a direct communication accept message including the Remote UE IP address to the Remote UE. Here, the Remote UE IP address may refer to IP address information of the Remote UE used in the PC5 link.

9) Relay UE may transmit IP address information of Remote UE used in PC5 link to SMF. For example, the relay UE may transmit a PDU session modification command Ack message to the SMF. The PDU session modification command Ack message may include IP address information of the Remote UE, ID information of the Remote UE, and PC5 session information.

10) The SMF may inform the PCF of Remote UE IP address information. For example, the SMF may transmit an SM Policy Association message (including ID information and session information of the Remote UE) to the PCF. The SM Policy Association message may further include Remote UE IP information.

11) When subscriber information (remote UE's subscriber information) is updated (eg, when a specific DNN/S-NSSAI is no longer allowed), the UDM may inform the SMF of the updated subscriber information. For example, the UDM may transmit a Nudm_SDM_Notification message or a Nudm_UECM_DeregistrationNotification message including updated subscriber information. Alternatively, the PCF may recognize that the subscriber information (the subscriber information of the remote UE) has been updated through the UDR, and the PCF may request the SMF to stop the service for the UE through the SM Policy Association Modification.

Step 12. When the SMF receives the updated subscriber information from the UDM, the SMF may decide to stop the service for a specific PC5 session of the Remote UE based on the subscriber information update. Alternatively, when the SMF receives a service stop request for a specific PC5 session of the Remote UE from the PCF, it may instruct the Relay UE to stop the service for the Remote UE by using the PDU Session Modification procedure.

To this end, the SMF may transmit a PDU Session Modification Command message to the Relay UE via the AMF. The PDU session modification command message includes information on the target UE (e.g. ID information of the Remote UE such as SUPI, SUCI, and Temporary ID), release indication, PC5 session information to perform release, and Cause (eg: release due to change in subscriber information), and the like.

13) The Relay UE may receive a release command for the Remote UE from the SMF. The Relay UE may transmit a Disconnect Request message to the Remote UE in order to release the PC5 session for which the SMF has commanded the release, according to the release command for the Remote UE. The Disconnect request message may include information on the target UE and cause information transmitted by the SMF. That is, the Relay UE may transmit the Cause transmitted by the SMF to the Remote UE while disconnecting the PC5 session with the Remote UE.

Step 14. The Relay UE may notify that the service to the Remote UE has been stopped by transmitting the PDU Session Command Ack to the SMF through the AMF.

Examples of operations performed by Relay UE, Remote UE, AMF, SMF, PCF, UDM, AUSF, etc. according to the first to third examples of the disclosure of the present specification described with reference to FIGS. 10 to 14B may include the following examples. The following examples are merely examples of the operations described in the first to third examples of the disclosure of the present specification, although not described in the following examples, the operations described in the first to third examples of the disclosure of the present specification above may be performed.

The AMF may receive the ID information of the Remote UE from the Relay UE. The AMF may obtain subscriber information for the Remote UE from the UDM based on the ID information of the Remote UE. In addition, the AMF may register the UDM to notify the AMF of the change in subscriber information when the subscriber information for the Remote UE is changed. The AMF may perform mobility management for the Remote UE based on this operation.

AMF may perform a registration procedure for a Remote UE with UDM. In order to prevent the UDM from performing deregistration to the AMF (the AMF connected through the remote UE and the Uu interface), the AMF may transmit an indication (or information) informing the UDM that the remote UE registers through the relay UE.

For policy update for the remote UE, the AMF may perform the operation of creating a UE policy association for the PCF and the remote UE. In this process, the AMF may transmit an indication to the PCF for notifying that the Remote UE is receiving service through the Relay UE, and may perform a procedure for creating a UE policy association.

The PCF may recognize that the Remote UE is serviced through the Relay UE. When a policy update for the remote UE is required, the PCF may perform an operation for security because policy information is transmitted to the remote UE through the relay UE. For example, for security, the PCF may perform an operation to request security from the AUSF. The PCF may perform policy update by sending a message including a security parameter generated through a request to the AUSF to the Remote UE.

The SMF may obtain subscriber information for the Remote UE from the UDM based on information transmitted from the Relay UE (eg, ID information of the Remote UE). In addition, the SMF may register to notify the UDM of a change in subscriber information for the Remote UE based on information (eg, ID information of the Remote UE) transmitted from the Relay UE. Based on this, when the subscriber information of the Remote UE is changed, the SMF may receive the updated subscriber information from the UDM. Based on the updated subscriber information, the SMF may perform an operation of instructing the relay UE to stop the service of the Remote UE when it is necessary to stop the service of the Remote UE.

The SMF may inform the PCF of information about the Remote UE (eg, ID information of the Remote UE, etc.) based on information transmitted from the relay UE (eg, ID information of the Remote UE). The PCF may recognize the change of subscriber information for the Remote UE through the UDR. According to the change of the subscriber information, when it is necessary to stop the service for the Remote UE, the PCF may instruct the SMF to stop the service for the Remote UE.

According to the first to third examples of the disclosure of the present specification, a network (eg, AMF, SMF, PCF, UDM, etc.) may perform mobility management for a Remote UE. The network may transmit a control signal to the Remote UE through mobility management and effectively manage the Remote UE through the control signal.

For reference, the operation of the terminal (eg, Remote UE or Relay UE) described in this specification may be implemented by the apparatus of FIGS. 15 to 20 to be described below. For example, the terminal (eg, Remote UE or Relay UE) may be the first wireless device 100 or the second wireless device 200 of FIG. 16. For example, the operation of the terminal (eg, Remote UE or Relay UE) described herein may be processed by one or more processors 102 or 202. The operations of the UE described herein may be stored in one or more memories 104 or 204 in the form of instructions/programs (e.g., executable code) executable by one or more processors 102 or 202. The one or more processors 102 or 202 may perform operation of the UE (eg, UE) described in the disclosure by controlling one or more memories 104 or 204 and one or more transceivers 106 or 206, and executing instructions/programs stored in the one or more memories 104 or 204 to be used in the present specification.

In addition, instructions for performing an operation of a terminal (eg, a Remote UE or a Relay UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (eg, Remote UE or Relay UE) described in the disclosure of the present specification.

For reference, the operation of the network node (eg, AMF, SMF, UPF, UDM, NG-RAN, gNB, AUSF, etc.) described in this specification may be implemented by the apparatus of FIGS. 15 to 20 to be described below. For example, the network node may be the first wireless device 100 or the second wireless device 200 of FIG. 16. For example, the operation of the network nodes described herein may be handled by one or more processors 102 or 202. The operations of the network nodes described herein may be stored in one or more memories 104 or 204 in the form of instructions/programs (e.g. instructions, executable code) executable by one or more processors 102 or 202. The one or more processors 102 or 202 may perform operation of the network node described in the disclosure by controlling one or more memories 104 or 204 and one or more transceivers 106 or 206, and executing instructions/programs stored in the one or more memories 104 or 204 to be used in the present specification.

In addition, the instructions for performing the operation of the network node (eg, AMF, SMF, UPF, UDM, NG-RAN, gNB, AUSF, etc.) described in the disclosure of the present specification may be stored in a non-volatile computer-readable storage medium for recording instructions. The storage medium may be included in one or more memories 104 or 204. In addition, the instructions recorded in the storage medium may be executed by one or more processors 102 or 202 to perform the operation of the network node described in the disclosure of the present specification.

IV. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 15:
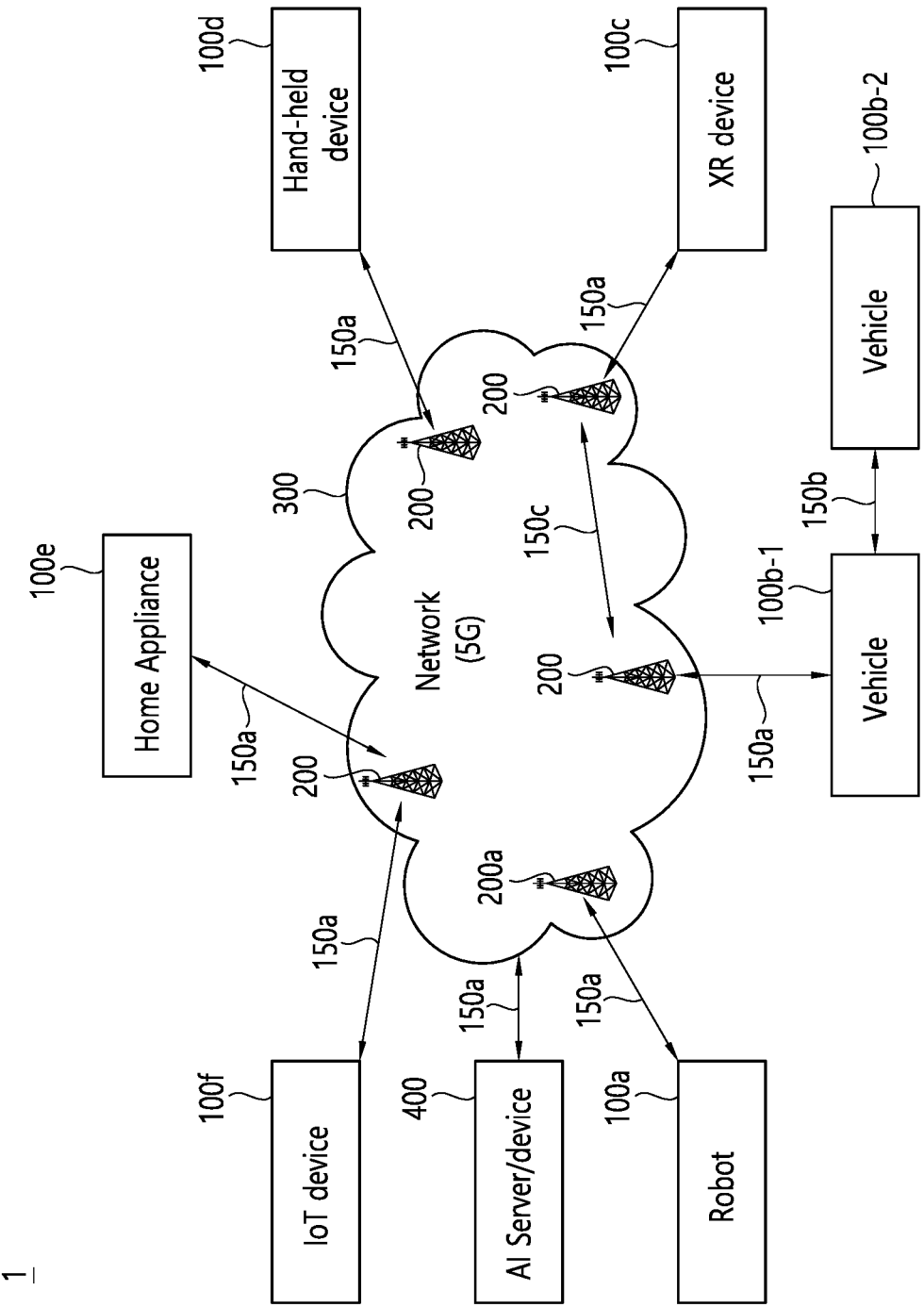
FIG. 15 illustrates a communication system 1 that can be applied to the present specification.

FIG. 15 illustrates a communication system 1 that can be applied to the present specification.

Referring to FIG. 15, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100*a*, a vehicle 100*b*-1, 100*b*-2, an eXtended Reality (XR) device 100*c*, a hand-held device 100*d*, a home appliance 100*e*, an Internet of Thing (IoT) device 100*f*, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200*a* may operate as a base station/network node to other wireless devices.

Figure 16:
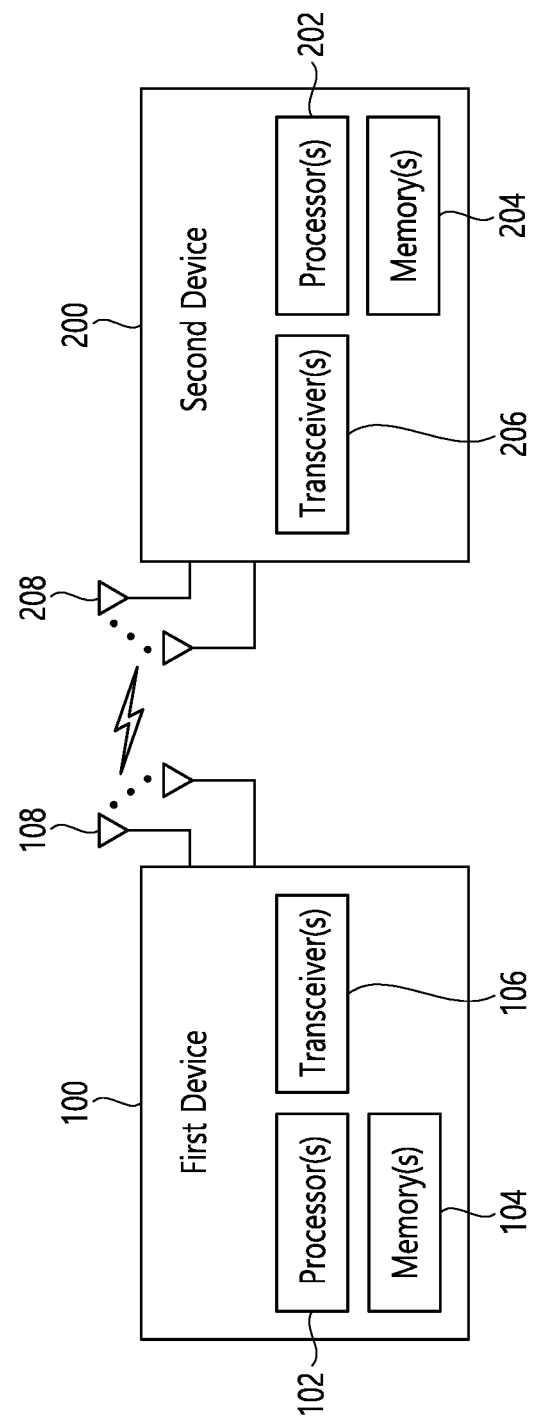
FIG. 16 illustrates an example of a wireless device that can be applied to the present specification.

Here, the wireless communication technology implemented in the wireless devices 100*a* to 100*f*, 400, and 100 and 200 of FIG. 16 of the present specification may include a narrowband Internet of Things for low-power communication as well as LTE, NR, and 6G. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100*a* to 100*f* and 400 of the present specification and 100 and 200 in FIG. 16 may perform communication based on the LTE-M technology. In this case, as an example, the LTE-M technology may be an example of an LPWAN technology, and may be called various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and the like, and is not limited to the above-described name. Additionally or alternatively, wireless communication technologies implemented in the wireless devices 100a to 100f, 400, and 100 and 200 in FIG. 16 of the present specification may include at least one of ZigBee in consideration of low-power communication, Bluetooth, and Low Power Wide Area Network (LPWAN), but is not limited to the above-described name. For example, the ZigBee technology can create PAN (personal area networks) related to small/low-power digital communication based on various standards such as IEEE 802.15.4, and can be called by various names.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/ base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like. The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

FIG. 16 illustrates an example of a wireless device that can be applied to the present specification.

Referring to FIG. 16, the first wireless device 100 and the second wireless device 200 may transmit and receive wireless signals through various wireless access technologies (eg, LTE, NR). Here, {first wireless device 100, second wireless device 200} may refer to {wireless device 100x, base station 200} and/or {wireless device 100x, wireless device 100x} of FIG. 15. Alternatively, it may correspond to the first wireless device 100 and UE, AMF, SMF, or UPF, etc described in the disclosure of the present specification. In addition, the second wireless device 200 may correspond to a UE, AMF, SMF, or UPF, etc. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs)

and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 17:
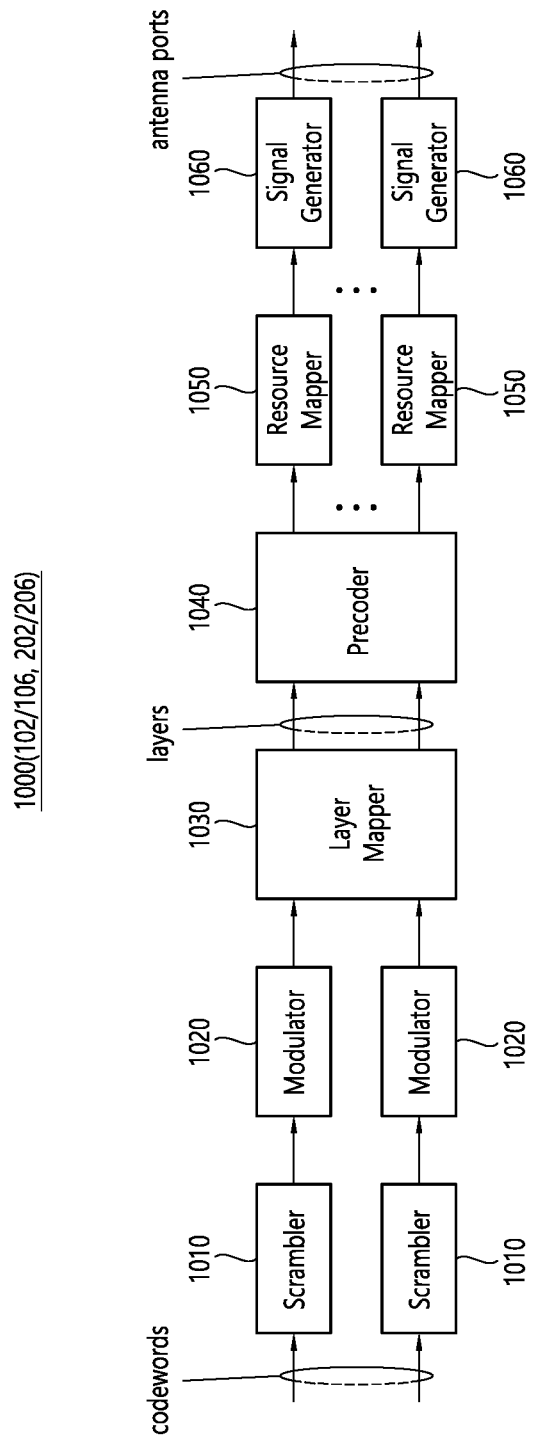
FIG. 17 illustrates an example of a signal processing circuit for a transmission signal.

FIG. 17 illustrates an example of a signal processing circuit for a transmission signal.

Referring to FIG. 17, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 17 may be performed in the processor (102, 202), the memory (104, 204) and/or transceiver (106, 206) of FIG. 16. The hardware element of FIG. 17 may be implemented in the processors 102 and 202 and/or the transceivers 106 and 206 of FIG. 16. For example, blocks 1010-1060 may be implemented in the processors 102, 202 of FIG. 16. Also, blocks 1010-1050 may be implemented in the processors 102 and 202 of FIG. 16, and block 1060 may be implemented in the transceivers 106 and 206 of FIG. 16.

The codeword may be converted into a wireless signal through the signal processing circuit 1000 of FIG. 17. Here, the codeword is an encoded bit sequence of the information block. The information block may include a transport block (e.g., a UL-SCH transport block and a DL-SCH transport block). The wireless signal may be transmitted through various physical channels (e.g., PUS CH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010-1060 of FIG. 17. For example, a wireless device (e.g., 100 and 200 of FIG. 16) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 18:
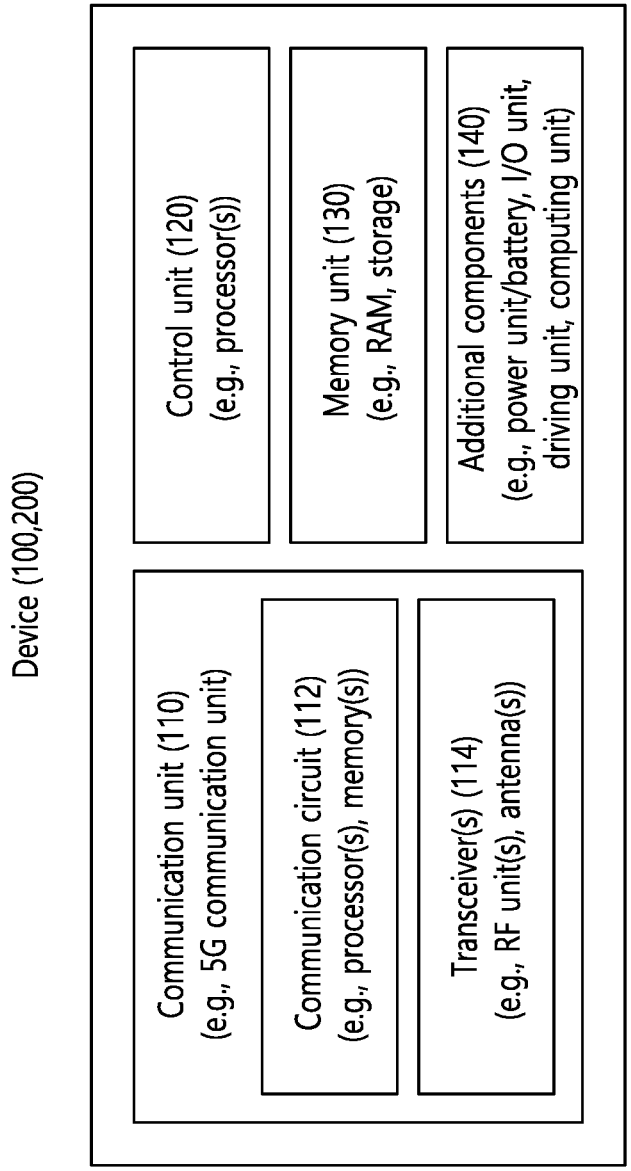
FIG. 18 illustrates another example of a wireless device that can be applied to the present specification.

FIG. 18 illustrates another example of a wireless device that can be applied to the present specification.

The wireless device may be implemented in various forms according to use-examples/services (refer to FIG. 15).

Referring to FIG. 18, the wireless devices 100 and 200 correspond to the wireless devices 100 and 200 of FIG. 16, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 16. For example, the transceiver (s) 114 may include one or more transceivers 106, 206 and/or one or more antennas 108, 208 of FIG. 16. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 16. For example, the memory unit 130 may include one or more memories 104 and 204 of FIG. 16.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 15, 100*a*), a vehicle (FIG. 15, 100*b*-1, 100*b*-2), an XR device (FIG. 15, 100*c*), a portable device (FIG. 15, 100*d*), a home appliance. (FIG. 15, 100*e*), IoT devices (FIG. 15, 1000, terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 18, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 19:
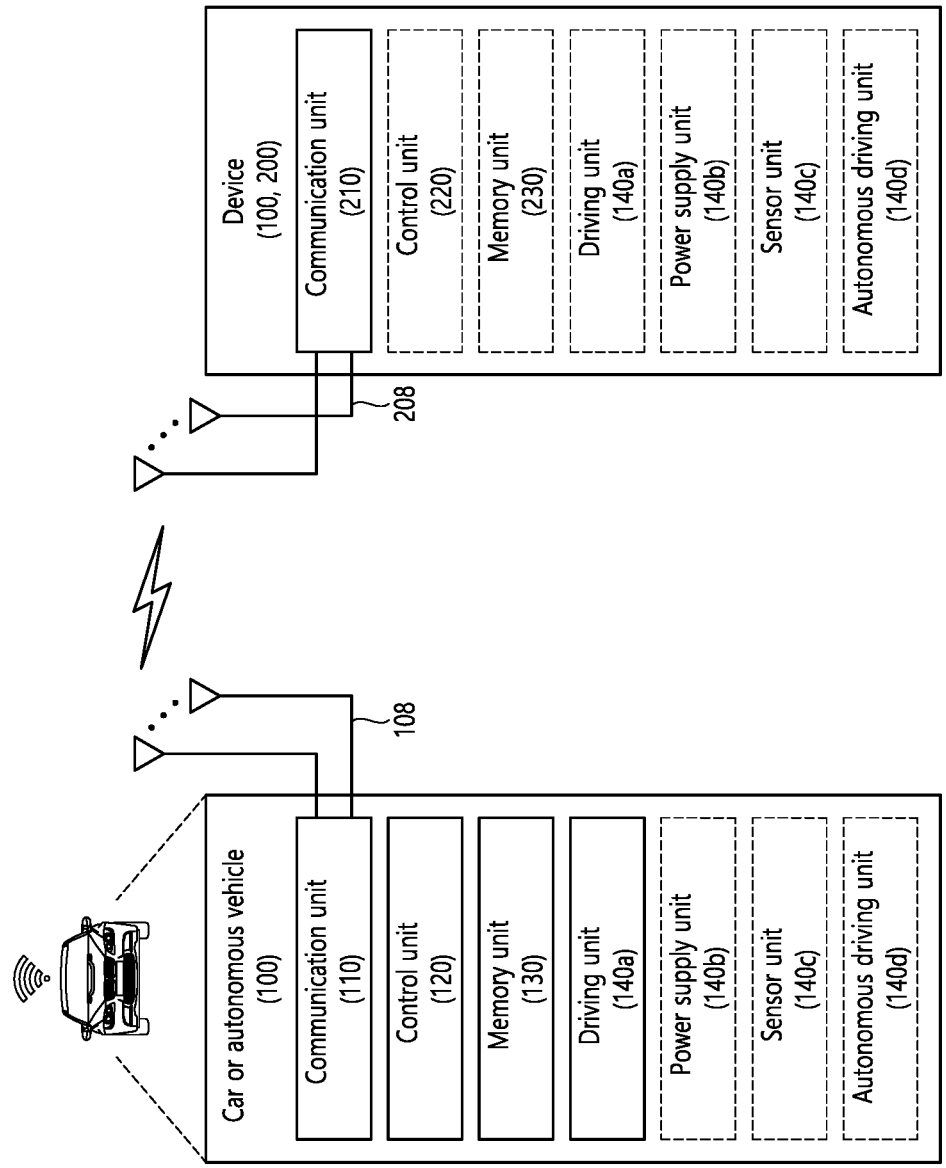
FIG. 19 illustrates an example of a vehicle or an autonomous vehicle that can be applied to the present specification.

FIG. 19 illustrates an example of a vehicle or an autonomous vehicle that can be applied to the present specification.

FIG. 19 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 19, the vehicle or the autonomous vehicle 100 may include an antenna unit 108, a communication unit 110, a control unit 120, a driving unit 140*a*, a power supply unit 140*b*, a sensor unit 140*c*, and autonomous driving unit 140*d*. The antenna unit 108 may be configured as part of the communication unit 110. The blocks 110/130/140*a* to 140*d* may correspond to blocks 110/130/140 of FIG. 18, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140*a* may cause the vehicle or the autonomous vehicle 100 to drive on the ground. The driving unit 140*a* may include an engine, a motor, a power train, wheels, a brake, a steering device, and the like. The power supply unit 140*b* supplies power to the vehicle or the autonomous vehicle 100, and may include a wired/wireless charging circuit, a battery, and the like. The sensor unit 140*c* may obtain vehicle status, surrounding environment information, user information, and the like. The sensor unit 140*c* includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140*d* may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140*d* may generate an autonomous driving route and a driving plan based on the obtained data. The control unit 120 may control the driving unit 140*a* to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140*c* may acquire vehicle state and surrounding environment information. The autonomous driving unit 140*d* may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 20:
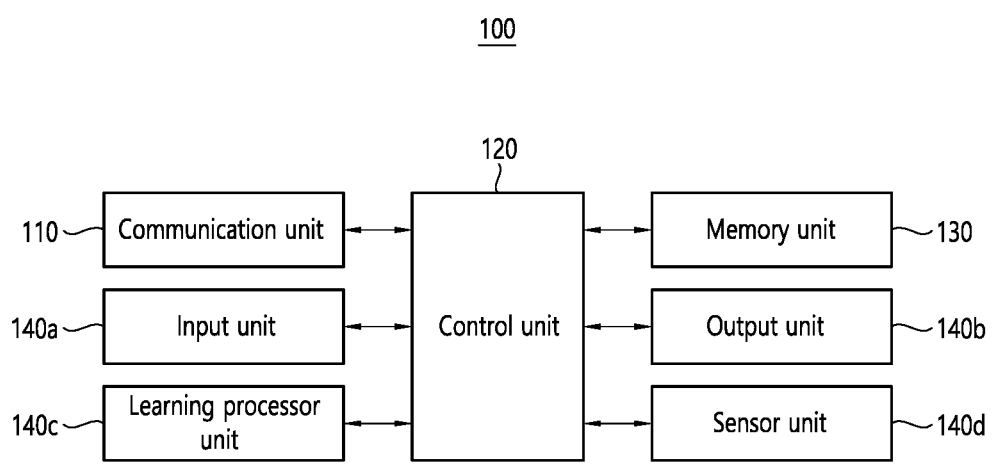
FIG. 20 illustrates an example of an AI device that can be applied to the disclosure of the present specification.

FIG. 20 illustrates an example of an AI device that can be applied to the disclosure of the present specification.

FIG. 20 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 20, the AI device 100 includes a communication unit 110, a control unit 120, a memory unit 130, an input/output unit 140*a*/140*b*, a learning processor unit 140*c*, and a sensor unit 140*d*. Blocks 110 to 130/140*a* to 140*d* respectively correspond to blocks 110 to 130/140 of FIG. 18.

The communication unit 110 communicates may transmit or receive wired signals and wireless signals (e.g., sensor information, user input, learning model, control signal, etc.) with external devices such as another AI device (e.g., FIG. 1, 100*x*, 200, 400) or an AI server (e.g., 400 of FIG. 15) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140*c* or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140*c* or transmits the information to an external device such as an AI server (FIG. 15, 400). The collected historical information can be used to update the learning model.

The memory unit 130 may store data supporting various functions of the AI device 100. For example, the memory unit 130 may store data obtained from the input unit 140*a*, data obtained from the communication unit 110, output data of the learning processor unit 140*c*, and data obtained from the sensing unit 140. In addition, the memory unit 130 may store control information and/or software code necessary for operation/execution of the control unit 120.

The input unit 140*a* may obtain various types of data from the outside of the AI device 100. For example, the input unit 140*a* may acquire training data for model learning, input data to which the training model is applied, and the like. The input unit 140*a* may include a camera, a microphone, and/or a user input unit. The output unit 140*b* may generate an output related to sight, hearing, or touch. The output unit 140*b* may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140*c* may train a model composed of artificial neural networks using the training data. The learning processor unit 140*c* may perform AI processing together with the learning processor unit of the AI server (FIGS. 12 and 400). The learning processor unit 140*c* may process information received from an external device through the communication unit 110 and/or information stored in the memory unit 130. In addition, the output value of the learning processor unit 140*c* may be transmitted to the external device through the communication unit 110 and/or stored in the memory unit 130.

The following drawings were created to explain a specific example of the present specification. The names of specific devices described in the drawings or the names of specific signals/messages/fields are presented by way of example, so that the technical features of the present specification are not limited to the specific names used in the following drawings.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing communication, the method performed by a first Access and Mobility Management Function (AMF) node and comprising:
receiving, at the first AMF node, remote UE registration request message including an ID of a Remote User Equipment (UE) from a relay UE communicating with the Remote UE;
transmitting, from the first AMF node, a registration message including relay information related to that the Remote UE is receiving service through the relay UE, to a Unified Data Management (UDM) node, based on that the ID of the Remote UE is received from the relay UE,
wherein the relay information prevents the UDM node from deregistering the remote UE with a second AMF node that was connected to the Remote UE through a Uu interface;
receiving, at the first AMF node, updated subscriber information of the Remote UE from the Unified Data Management (UDM) node;
determining, at the first AMF node, whether to stop service for the Remote UE, based on the updated subscriber information of the Remote UE; and
transmitting, from the first AMF node, a deregistration request message for requesting deregistration for the Remote UE to the Relay UE, based on the determination to stop the service for the Remote UE.

2. The method of claim 1,
wherein the deregistration request message includes information related to the Remote UE and a cause value.

3. The method of claim 2, wherein the information related to the Remote UE includes a Subscription Concealed Identifier (SUCI), a Subscription Permanent Identifier (SUPI), or a 5G-GUTI (Global Unique Temporary Identifier) of the Remote UE.

4. The method of claim 2,
wherein the deregistration request message is used by the Relay UE to transmit a Disconnect request message to the Remote UE.

5. The method of claim 1, further comprising:
obtaining subscription information of the Remote UE from the UDM node based on the ID of the Remote UE.

6. The method of claim 1, further comprising:
transmitting a registration response message to the Relay UE, in response to the remote UE registration request message,
wherein the registration response message is used by the Relay UE to transmit a direct communication accept message to the Remote UE.

7. The method of claim 1, further comprising:
transmitting a registration request message for the Remote UE to the UDM node based on the ID of the Remote UE.

8. A method for performing communication, performed by a relay User Equipment (UE) and comprising:
transmitting, from the relay UE, remote UE registration request message including ID of a Remote UE communicating with the Relay UE to a first Access and Mobility Management Function (AMF) node,
wherein the ID of the Remote UE enables the AMF node to transmit relay information related to that the Remote UE is receiving service through the relay UE, to a Unified Data Management (UDM) node, and
wherein the relay information prevents the UDM node from deregistering the remote UE with a second AMF node that was connected to the Remote UE through a Uu interface;
receiving, at the relay UE, a deregistration request message requesting deregistration for a Remote UE the Relay UE from the Access and Mobility Management Function (AMF) node; and
transmitting, from the relay UE, a Disconnect request message to the Remote UE, based on that the deregistration request message is received,
wherein the deregistration request message includes information related to the Remote UE and a cause (cause) value.

9. The method of claim 8, further comprising:
receiving a direct communication request message from the Remote UE,
wherein the direct communication request message includes the ID of the Remote UE.

10. The method of claim 9,
wherein the remote UE registration request message is transmitted, based on the direct communication request message being received.

11. An Access and Mobility Management Function (AMF) node performing communication, comprising:
at least one processor; and
at least one memory storing instructions and operably electrically connectable with the at least one processor;
wherein the at least one processor executes the instructions to perform:
receiving remote UE registration request message including an ID of a Remote User Equipment (UE) from a relay UE communicating with the Remote UE;
transmitting a registration message including relay information related to that the Remote UE is receiving service through the relay UE, to the Unified Data Management (UDM) node, based on that the ID of the Remote UE is received from the relay UE,
wherein the relay information prevents the UDM node from deregistering the remote UE with a second AMF node that was connected to the Remote UE through a Uu interface;
receiving updated subscriber information of Remote UE from a Unified Data Management (UDM) node;
determining whether to stop service to the Remote UE based on the updated subscriber information of the Remote UE; and
transmitting a deregistration request message requesting deregistration for the Remote UE to a relay UE, based on the determination to stop the service for the Remote UE.

* * * * *